United States Patent
Suzuki et al.

(10) Patent No.: US 7,593,974 B2
(45) Date of Patent: *Sep. 22, 2009

(54) METHOD AND DATABASE SYSTEM FOR DUPLICATING TRANSACTIONS BETWEEN REMOTE SITES

(75) Inventors: Yoshio Suzuki, Kokubunji (JP); Shinji Fujiwara, Sagamihara (JP); Tsunehiko Baba, Kokubunji (JP)

(73) Assignee: Hitachi, Ltd, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/647,201

(22) Filed: Dec. 29, 2006

(65) Prior Publication Data

US 2007/0226276 A1    Sep. 27, 2007

Related U.S. Application Data

(63) Continuation of application No. 10/637,556, filed on Aug. 11, 2003, now Pat. No. 7,181,479.

(30) Foreign Application Priority Data

Mar. 27, 2003    (JP)    ............................. 2003-087773

(51) Int. Cl.
G06F 17/30    (2006.01)
(52) U.S. Cl. ................... 707/204; 707/200; 707/201; 707/202
(58) Field of Classification Search ......... 707/200–202, 707/204
See application file for complete search history.

(56) References Cited

U.S. PATENT DOCUMENTS

| | | | |
|---|---|---|---|
| 5,671,350 A | 9/1997 | Wood | |
| 6,195,744 B1 | 2/2001 | Favor et al. | |
| 6,442,706 B1 | 8/2002 | Wahl et al. | |
| 6,453,325 B1 | 9/2002 | Cabrera et al. | |

(Continued)

FOREIGN PATENT DOCUMENTS

JP    2002-49517    9/2000

(Continued)

OTHER PUBLICATIONS

"EMC Symmetrix Remote Data Facility (SRDF)", http://www.emc.com/products/product_pdfs/ds/srdf_ds_152 3-7.pdf.

(Continued)

*Primary Examiner*—Cam-Linh Nguyen
(74) *Attorney, Agent, or Firm*—Stites & Harbison PLLC; Juan Carlos A. Marquez, Esq.

(57) ABSTRACT

A method for duplicating transactions in a disaster recover system is disclosed. In this method, transactions and queries input to a primary database system are copied to a secondary database system and both database systems execute the queries and save the results permanently to each database, thereby maintaining duplicated data. When executing a query on the primary database system, if the query is a commit, the primary system simultaneously copies uncopied queries placed in a queue to the secondary database system and then executes the query. By using this processing procedure, the invention realizes a disaster recovery system which carries out copying transactions from one site to another site without losing the transactions, while reducing the influence of copy operation on the transaction processing performance.

9 Claims, 16 Drawing Sheets

U.S. PATENT DOCUMENTS

| | | |
|---|---|---|
| 6,529,921 B1 | 3/2003 | Berkowitz et al. |
| 6,591,351 B1 | 7/2003 | Urabe et al. |
| 6,594,676 B1 | 7/2003 | Moore |
| 6,785,789 B1 | 8/2004 | Kekre et al. |
| 2003/0182313 A1 | 9/2003 | Federwisch et al. |
| 2004/0073831 A1 | 4/2004 | Yanai et al. |

OTHER PUBLICATIONS

Roger Ruby, Production Manager, "Info-Superhighway: On/Off-Ramp or 'Speed-bump'", Inverse Multiplexing over ATM, Oct. 2001, 5 pages.

Gurindar S Sohi, "Instruction Issue Logic for High-Performance, Interruptible, Multiple Functional Unit, Piplined Computers", IEEE Transactions on Computers, vol. 39, No. 3, Mar. 1990, pp. 349-359.

NORMAL OPERATION (1)

NORMAL OPERATION (2)

RECOVERY FROM FAILURE

METHOD AND DATABASE SYSTEM FOR DUPLICATING TRANSACTIONS BETWEEN REMOTE SITES

This application is a Continuation of U.S. application Ser. No. 10/637,556 filed on Aug. 11, 2003, now U.S. Pat. No. 7,181,479 which claims priority to Japanese Patent Application No. 2003-087773, filed on Mar. 27, 2003, the entire disclosure of which is incorporated herein by reference.

BACKGROUND OF THE INVENTION

1. Field of the Invention

The present invention relates to a database system and, more particularly, to control of copying transactions from one database to another database.

2. Description of the Related Art

In business sectors, the importance of IT systems is becoming greater and greater. For example, in the financial industry, an IT system breakdown is estimated to cause a loss of hundreds of billion of dollars. Accordingly, a high availability (HA) technique is becoming important which provides duplicated computing systems at a primary site and a secondary site. In case failure should happen in the primary site computing system, failover occurs automatically to the secondary site computing system to keep the service on.

While system failure may occur due to diverse causes such as system errors, human-induced operation errors, and power failure, a Disaster Recover (D/R) technique attracts attention in which service and IT system recovery is quickly performed even in case of a large-scale disaster happening. In the D/R technique, data copy is performed between duplicated computing systems at the primary site and the secondary site to provide data integrity and the most important requirement is data integrity, that is, there shall be no missing data. Moreover, there is an increasing need to build the secondary site system at a remote location from the primary site for countermeasures against large-scale disasters.

A conventional D/R system configuration is shown in FIG. 16.

The conventional D/R system is comprised of a primary site 100 and a secondary site 110 which is remote from the primary site. The primary site 100 carries out operations such as data recording and search. On the other hand, the secondary site 110 stores the same data contents as stored on the primary site 100 and functions as a backup site of the primary site 100.

Each site 100 (110) is comprised of a server 101 including a DBMS 103 and storage (DB) 102. Both the sites 100 and 110 are connected by a server-to-server network 122 and/or a storage-to-storage network 121.

The primary site 100 receives input from a client 130 (user application (UAP)) and permanently saves results of operation in response to the input to the DB 102. The input from the UAP is ordinarily recognized as a transaction. Here, the transaction consists of a plurality of queries written in SQL that is a standard language for the DBMS (data management system). There are several types of queries: e.g., Insert, Update, and Commit. If a query which is included in a transaction and other than a commit is executed, the result of the query is only stored into a buffer within the DBMS 103 on the server 101 in the primary site 100. Only after the commit is executed, the results of a series of queries in the transaction executed until the commit execution are permanently saved to the storage 102 and the transaction is fixed. The primary site 100 copies the transaction and the data as the results of the transaction execution (registered in a table or the like in the DBMS) to the secondary site 110 at any timing. In case failure should happen in the primary site, failover occurs automatically to the secondary site 110 and the secondary site 110 which was being the backup site takes over the operation and executes it.

Conventionally, copies through the server-to-sever network 122 have been performed to copy transactions from one site to another site. Meanwhile, "EMC Symmetrix Remote Data Facility (SRDF)" (http://www.emc.com/products/product_pdfs/ds/srdf_ds__1523-7.pdf) discloses that copies through the storage-to-storage network have lately been applied and the reason hereof is that loads on the servers are eliminated during a copy and the storages are higher reliable than the servers.

These copies may be performed in either synchronous (sync) copy mode or asynchronous (async) copy mode, independent of the server-to-server and storage-to-storage networks.

For a sync copy from the primary site 100 to the secondary site 110, when the server 101 in the primary site issues a sync copy command, data to be copied is written to a disk cache in the storage (primary) 102 connected to the primary site. Then, the storage (primary) 102 copies the data to a disk cache in the storage (secondary) 112 in the secondary site. When having received a data receive acknowledge response from the storage (secondary) 112, the storage (primary) 102 returns a sync copy complete response to the server 101 that issued the data copy request. By executing the sync copy to the secondary site 110 in synchronization with a commit, data copy with no possibility of losing data is achieved. However, the sync copy involves delay for a wait time for the response from the storage (secondary) 112 and such delay becomes a problem when the distance between the sites is long.

On the other hand, when an async copy is applied, as soon as data to be copied is written to the disk cache in the storage (primary) 102, the response is returned to the server 101 that issued the data copy request and the copy of the data to the storage (secondary) 112 is performed at appropriate timing. This copy mode involves no delay, but it is not ensured that the data is copied to the secondary site 110 when the response is returned to the server 101 that issued the data copy request and there is a possibility of missing data.

JP-A No. 2002-045917 discloses a method that combines the async copy and the sync copy, which is regarded as intermediate between these modes and uses a command for confirmation of async copy complete. According to this method, the async copy mode is performed when synchronization is not required and the above command is executed when synchronization becomes necessary. Subsequent processing is suspended until it has been confirmed that the async copy is complete, thereby effecting copying data from one site to another site with no possibility of losing the data.

In the D/R system, when failure occurs in the primary site, after recovery processing such as confirming the consistency of the databases is performed in the secondary site 110, the system operation continues in the secondary site 110. If the async copy mode is applied, complete recovery cannot be performed because missing data may occur. On the other hand, even if the sync copy mode is applied, recovery processing in the first phase after the detection of failure may require much time. For example, recovery may be performed, using a full backup copy for a long period and incremental backup copies from the full backup. In this manner of recovery processing, after the full backup is initially restored and incremental backup copies are sequentially applied. Thus, the time required for the recovery processing increases, according to the size and number of data sets to back up The above-described conventional D/R system has the following problems.

In order to carry out copying transactions from one site to another site without losing transactions, the sync copy mode is generally used, but delay for awaiting a sync copy complete becomes a problem especially when the distance between the sites is long. If the async copy mode is used, no delay occurs, but it cannot be ensured that transactions are copied to the secondary site. In other words, copying transactions from one site to another site with no possibility of losing the transactions cannot be fulfilled.

If the async copy mode is used, missing transactions may occur and complete recovery cannot be performed in case failure should occur. Even if the sync copy mode is used, in the first phase of recovery processing after failure occurring, recovery by updating difference from the full backup (incremental backup) requires much processing time and quick operation recovery cannot be performed.

Accordingly, it is desired to realize a D/R system which carries out copying transactions from one site to another site without losing the transactions, while minimizing the influence of copy operation on the transaction processing performance between remotely located sites.

For such a D/R system comprising remotely located sites, it is desired to carry out quick recovery after failure detection.

SUMMARY OF THE INVENTION

The present invention provides a method for duplicating transactions, each consisting of one or two or more queries, between a first information processing equipment which comprises a computing device and storage and a second information processing equipment which comprises a computing device and storage, wherein the first information processing equipment, when executing a query, determines whether the query has been copied to the second information processing equipment; if the query has been copied, the first information processing equipment executes the query; if the query has not been copied and if the query is a commit to permanently save results of the executed transaction including the commit query to the storage, the first information processing equipment simultaneously copies queries remaining uncopied among accepted queries to the second information processing equipment (for example, a sync copy).

In addition to a first copy mode (for example, a sync copy) of simultaneously copying the uncopied queries when executing a query, queries may be copied by a second copy mode (for example, a sync copy or async copy) of monitoring the accepted queries at predetermined timing and simultaneously copying queries remaining uncopied, if exist, to the second information processing equipment.

Also, the first information processing equipment manages whether the commit executed status has been copied to the second information processing equipment and, after the execution of the commit, if the commit executed status has not been copied to the second information processing equipment, the first information processing equipment simultaneously copies the executed statuses of queries with their executed status remaining uncopied among the accepted queries to the second information processing equipment (for example, an async copy).

In another aspect, the invention provides a method for duplicating transactions, each consisting of one or two or more queries, between a first information processing equipment which comprises a computing device and storage and a second information processing equipment which comprises a computing device and storage, wherein the first information processing equipment, when executing a commit, if the commit remains uncopied, simultaneously copies queries remaining uncopied among accepted queries to the second information processing equipment, and the second information processing equipment determines that queries copied thereto before receiving the queries simultaneously copied from the first information processing equipment have been executed on the first information processing equipment and executes the queries determined executed.

In still another aspect, the present invention provides a method for duplicating transactions, each consisting of one or two or more queries, between a first information processing equipment which comprises a computing device and storage and a second information processing equipment which comprises a computing device and storage, wherein the second information processing equipment receives queries copied from the first information processing equipment, records a range of the copied queries, checks the queries falling within the range of the copy and queries falling within the range of the preceding copy, and records data for transactions for which a commit to permanently save results of the executed transaction to the storage has not been executed among the queries within the range of the preceding copy as data for recovery.

In yet another aspect, the present invention provides a method for duplicating transactions, each consisting of one or two or more queries, between a first information processing equipment which comprises a computing device and storage and a second information processing equipment which comprises a computing device and storage, wherein the second information processing equipment receives queries copied from the first information processing equipment, creates data for failure recovery, upon detecting failure of the first information processing equipment, stores data for transactions for which a commit to permanently save results of the executed transaction to the storage has not been executed among the queries within the range of the copy from the first information processing equipment from the data for recovery to roll back the transactions to the state before the start of the transaction, and stores data for transactions for which results of the executed transaction have been permanently saved to the storage among the queries within the range of the copy from the first information processing equipment as the data for manual recovery.

In the method for duplicating transactions in accordance with the present, the first information processing equipment, when executing a query, determines whether the query has been copied to the second information processing equipment; if the query has been copied, the first information processing equipment executes the query; if the query has not been copied and if the query is a commit to permanently save results of the executed transaction including the commit query to the storage, the first information processing equipment simultaneously copies queries remaining uncopied among accepted queries to the second information processing equipment. Before executing a commit, it is always ensured that the queues relevant to the commit have been copied to the second information processing apparatus. Accordingly, even for remotely located sites, a D/R system which carries out copying transactions from one site to another site with no possibility of losing the transactions, while reducing the influence of copy operation on the throughput performance of transaction processing can be realized.

DETAILED DESCRIPTION OF THE PREFERRED EMBODIMENTS

Figure 1:
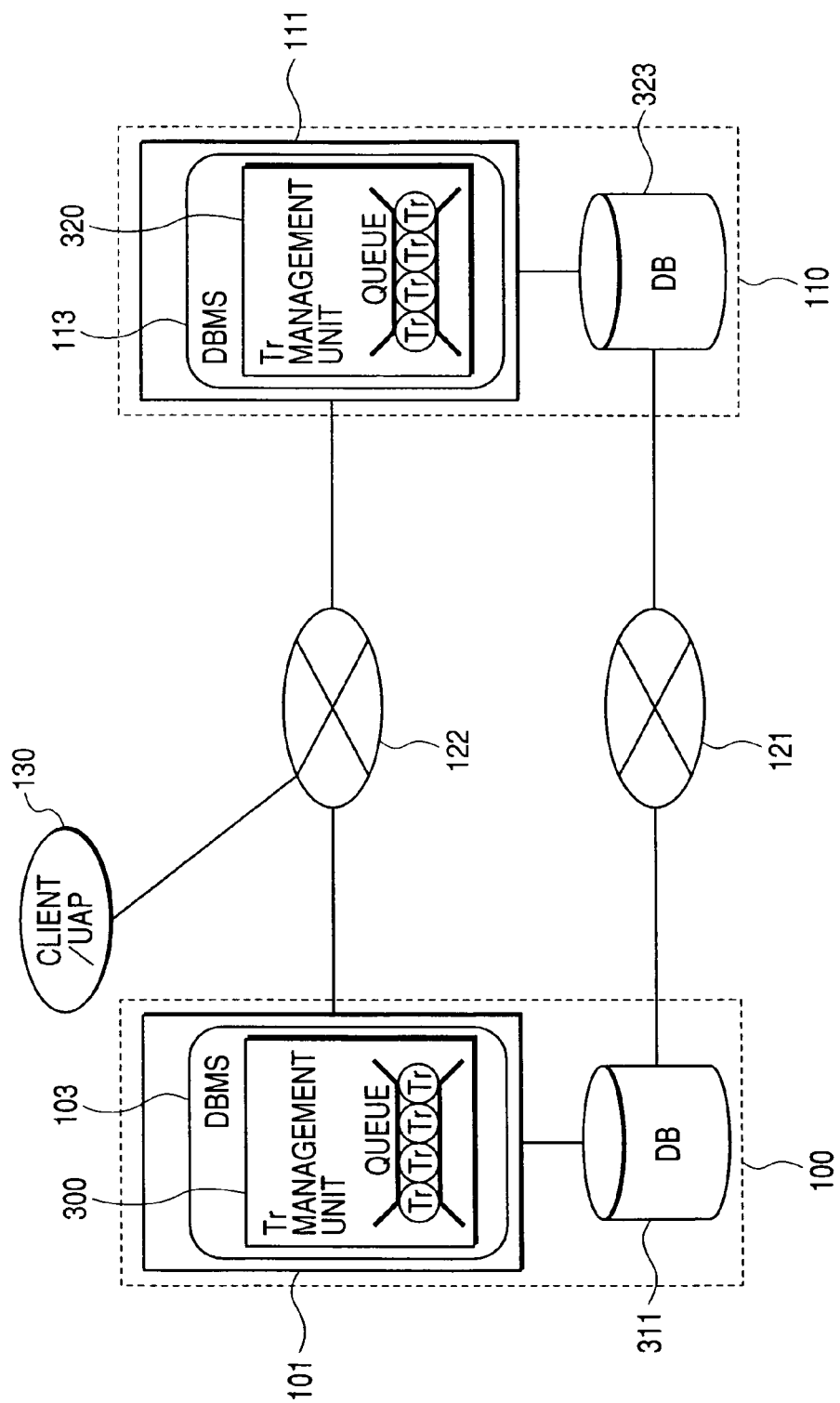
FIG. 1 is a D/R system configuration diagram according to a preferred embodiment of the present invention.

FIG. 1 is a D/R system configuration diagram according to a preferred embodiment of the present invention.

The D/R system (Disaster Recovery System) of the present preferred embodiment is comprised of a primary site 100 and a secondary site 110 which is remote from the primary site. The primary site 100 carries out operations such as data recording and search. On the other hand, the secondary site 110 stores the same data contents as stored on the primary site 100 and functions as a backup site of the primary site 100.

The primary site 100 is comprised of a server 101 including a DBMS 103 and storage (DB) 311. The secondary site 110 is comprised of a server 111 including a DBMS 113 and storage (DB) 323. Both the sites 100 and 110 are connected by a server-to-server network 122 and/or a storage-to-storage network 121.

The primary site 100 receives input from a client 130 (user application (UAP)) and permanently saves results of operation in response to the input to the DB 311. The input from the UAP is ordinarily recognized as a transaction. Here, the transaction consists of a plurality of queries written in SQL that is a standard language for the DBMS (data management system). There are several types of queries: e.g., Insert, Update, and Commit. If a query which is included in a transaction and other than a commit is executed, the result of the query is only stored into a buffer within the DBMS 103 on the server 101 in the primary site 100. Only after the commit is executed, the results of a series of queries in the transaction executed until the commit execution are permanently saved to the storage 311 and the transaction is fixed. The primary site 100 copies the transaction and the data as the results of the transaction execution (registered in a table or the like in the DBMS) to the secondary site 110 at any timing. In case failure should happen in the primary site, failover occurs automatically to the secondary site 110 and the secondary site 110 which was being the backup site takes over the operation and executes it.

The DBMS 103 includes a transaction (Tr) management unit 300 and the Tr management unit 300 copies transactions between the primary site 100 and the secondary site 110. In some embodiment, the DBMS 103 may not include the Tr management unit 300 and, instead, the Tr management unit 300 provided by software such as a TP monitor may manage transactions to be copied from the primary site 100 to the secondary site 110.

Figure 2:
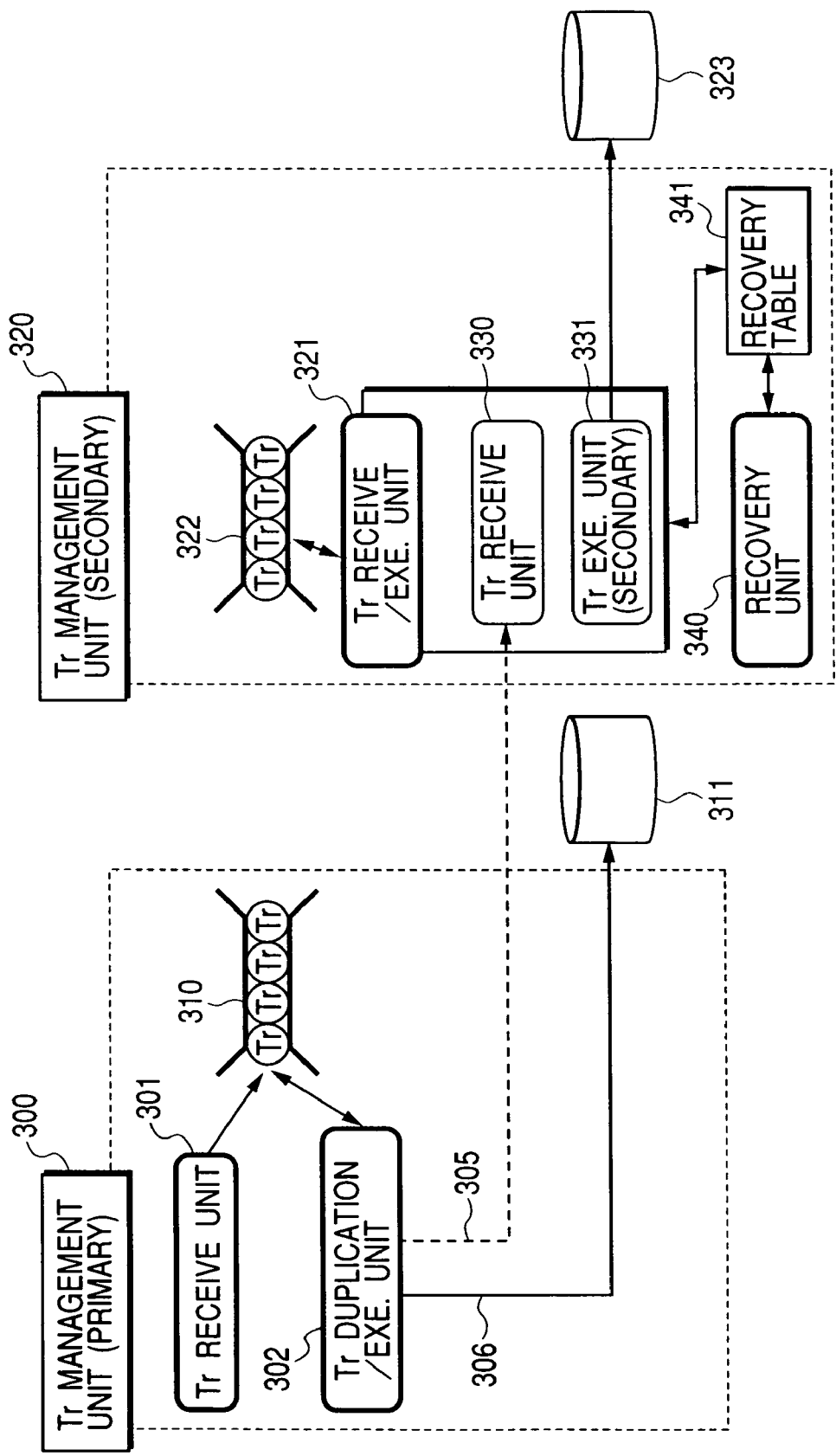
FIG. 2 is a diagram showing one example of the configurations of transaction management units according to a preferred Embodiment 1 of the present invention.

FIG. 2 is a diagram showing one example of the configurations of Tr management units according to a preferred Embodiment 1 of the present invention.

The Tr management unit 300 in the primary site is comprised of three software components: a transaction (Tr) receive unit 301, a transaction (Tr) duplication and execution unit 302, and a transaction (Tr) queue 310.

Transactions input from the client (UAP) are once stored into the Tr queue 310 and then executed. The Tr queue 310 manages not only the contents of the transactions (the queries constituting a transaction) but also the states of the transactions (whether the transactions and queries have been copied to the secondary site or executed).

The Tr receive unit 301 accepts a transaction entered and stores the transaction into the Tr queue 310.

The Tr duplication and execution unit 302 executes and copies transactions. Specifically, the Tr duplication and execution unit 302 retrieves queries constituting a transaction from the Tr queue 310 in sequence in which the queries were stored into the Tr queue 310 and executes the queries sequentially. Also, the Tr duplication and execution unit 302 copies queries to a Tr management unit 320 in the secondary site, according to the states of the queries, thus copying transactions.

Figure 5:
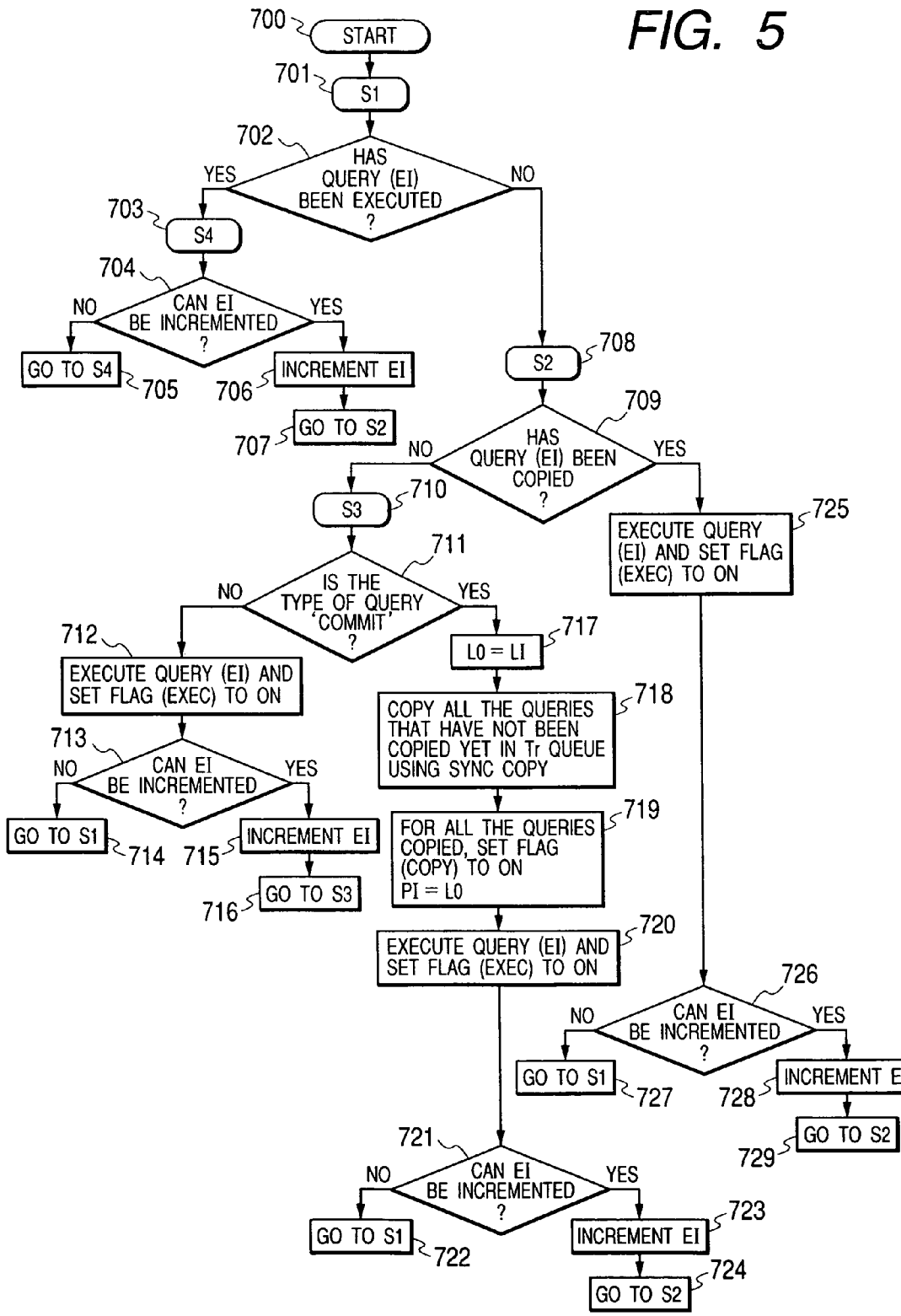
FIG. 5 is a flowchart of processing that is performed by a transaction (Tr) duplication and execution unit in Embodiment 1 of the present invention.

As will be detailed in FIG. 5, if a query retrieved from the Tr queue 310 has been copied to the Tr management unit 320 in the secondary site, the Tr duplication and execution unit 302 executes the query. If the query is a commit, the transaction relevant to the query has now become fixed and the results of the transaction execution are permanently saved to the storage 311. If the query is not a commit, the result of the executed query in the transaction that is not executed completely is stored into the DB buffer within the DBMS 103.

Otherwise, if the query retrieved from the Tr queue 310 has not been copied to the Tr management unit 320 in the secondary site, the Tr duplication and execution unit 302 determines whether copying the query to the secondary site is required. If the query is not a commit, the Tr duplication and execution unit 302 immediately executes the query without copying it. Otherwise, if the query is a commit, the Tr duplication and execution unit 302 executes a synchronous (sync) copy to the Tr management unit 320 in the secondary site. By the sync copy, not only the query, but also all uncopied data of queries of transactions stored in the Tr queue 310 are copied simultaneously to the Tr management unit 320. Then, the Tr duplication and execution unit 302 executes the query to be executed. Thus, because the Tr duplication and execution unit 302, before executing a commit, always copies the data of the queues constituting the transaction relevant to the commit to the Tr management unit 320 in the secondary site, it is ensured that no part of the transaction data is missing.

The Tr management unit 320 in the secondary site is comprised of a Tr receive and execution unit 321, a recovery unit 340, a Tr queue 322, and a recovery table 341. The Tr receive and execution unit 321 receives a transaction copied from the primary site 100 and executes the committed and fixed transaction. If failure should occur in the primary site 100, failure recovery processing is performed in the secondary site 110 and the secondary site 110 takes over the operation which was being performed in the primary site 100.

The Tr receive and execution unit 321 is comprised of a Tr receive unit 330 and a Tr execution unit 331. The Tr receive unit 330 communicates with the Tr duplication and execution unit 302 in the primary site, receives transactions transmitted from the primary site 100, and stores the transactions into the Tr queue 322. The Tr execution unit 331 executes a transaction for which the commit was executed in the primary site 100.

At this time, the Tr receive unit manages the copy states of the queries data constituting a transaction (checking whether all the queries data has been copied by a latest simultaneous sync copy). The Tr execution unit determines whether the transaction has been committed in the primary site by the copied/uncopied states of the queries data constituting the transaction. If it is determined that the commit has been executed for the transaction, the transaction commit is executed in the secondary site also. Otherwise if it is determined that the commit has not been executed for the transaction in the primary site, the essential data of the transaction is stored into the recovery table 341.

Each time a copy is performed, the Tr receive and execution unit 321 updates the transaction data in the recovery table 341. By this update, the data for transactions for which commit execution in the primary site 100 cannot be ascertained remain in the recovery table 341. For example, the commit itself has not been input (any failure has occurred before the input of the commit) and the commit has been input, but it cannot be determined whether the commit has been executed. These instances are regarded as gray transactions for which commit execution cannot be ascertained.

In the present embodiment, before a commit is executed, the queries data about the transaction to be committed is copied, and, therefore, the secondary site 110 can know that the commit has been input in the primary site 100 when having received the copy. However, the secondary site 110 cannot determine whether the commit has been executed certainly. The secondary site 110 will know that the commit has been executed only after the completion of the next simultaneous copy of queries subsequent to the simultaneous copy of the queries including the commit. According to the above-described simultaneous copy procedure, after transactions and queries in a set are simultaneously copied to the secondary site 110, the primary site 100 executes the transactions and queries relevant to the copy. After all these copied transactions and queries are executed in the primary site, the next copy of queries is performed. Therefore, when the secondary site 110 receives the queries simultaneously copied from the primary site, it can judge that all the queries received at the time of the preceding copy have been executed in the primary site. At this time, the secondary site executes queries which are not executed in the secondary site, if included among the queries determined executed in the primary site.

Should failure occur in the primary site 100, the recovery unit 340 performs failure recovery processing required for the secondary site 110 to hand over the operation. The recovery unit 340 checks for gray transactions for which a commit has been input, but it cannot be determined whether the commit has been executed in the primary site 100 among the received transactions, bans access to data related to the gray transactions, and restarts the operation in a limited way. At the same time, the gray transactions are manually recovered. Upon the completion of the manual recovery, the access banning is removed and the operation restarts completely.

For the above-described copying of transactions and queries from the primary site 100 to the secondary site 110, it is preferable to apply a sync copy mode. However, in some implementation, it may also be preferable to apply an asynchronous (async) copy mode.

Figure 3:
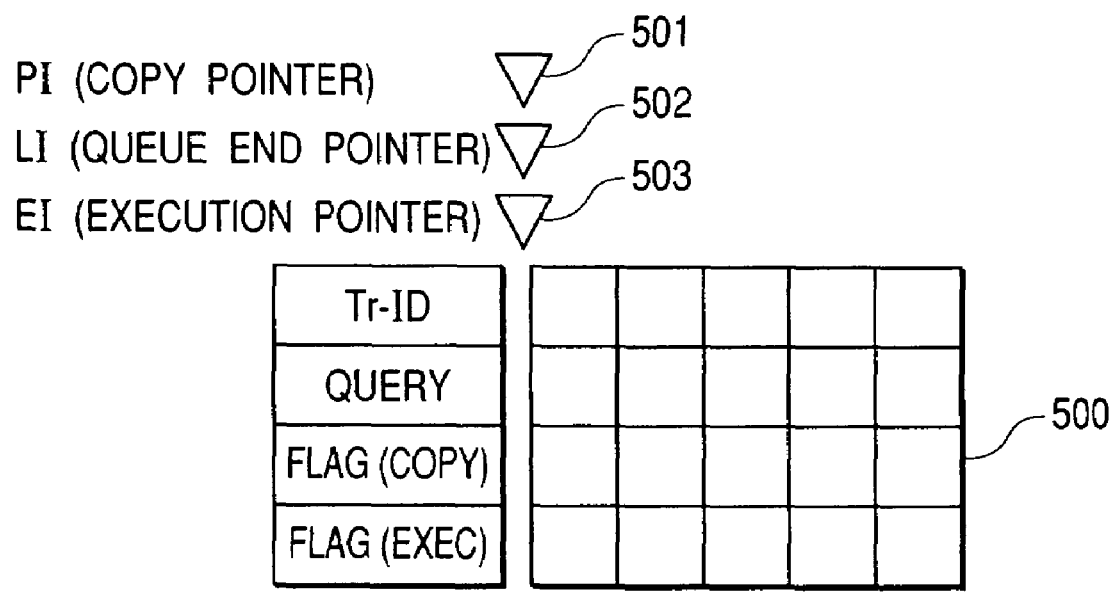
FIG. 3 illustrates a transaction (Tr) queue in the primary site in Embodiment 1 of the present invention.

FIG. 3 illustrates an example of structure of the Tr queue 310 in the primary site in Embodiment 1 of the present invention.

Because a transaction consists of one or a plurality of queries, query attributes are registered per query in a table 500. In the table, the following attributes are registered for a query: transaction ID unique to a transaction that includes the query; what type of the query; a copy flag to indicate whether or not the query has been copied; an execution flag to indicate whether or not the query has been executed. The above flags can assume one of the three values "ON," "OFF," and "null."

The table 500 has three pointers. A first pointer (copy pointer: PI) 501 points at the last copied query. A value of (PI+1) denotes the oldest one among uncopied queries. A second pointer (queue end pointer: LI) 502 points at the query that last entered the Tr queue (latest query). A third pointer (execution pointer: EI) 503 points at the query that is going to be passed to the Tr duplication and execution unit where the query type is identified and a processing procedure is determined. Determining the query processing procedure will be detailed later, using FIG. 5. If a plurality of unexecuted queries exist in the Tr queue, the execution pointer EI points at the oldest one of the unexecuted queries.

Figure 4:
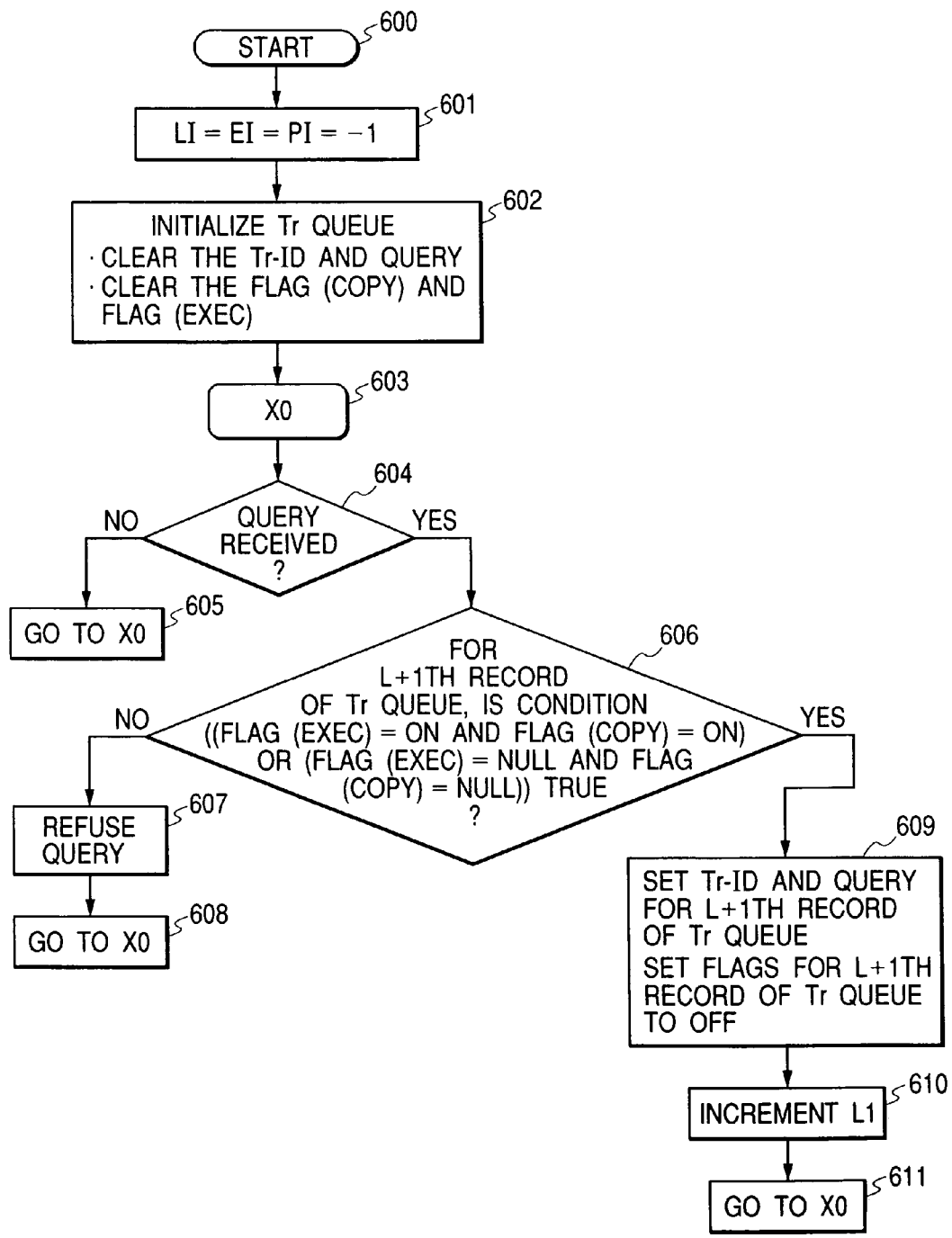
FIG. 4 is a flowchart of processing that is performed by a transaction (Tr) receive unit in the primary site in Embodiment 1 of the present invention.

FIG. 4 is a flowchart of processing that is performed by the Tr receive unit in Embodiment 1 of the present invention.

The Tr receive unit 301 in the primary site receives a transaction (queries constituting the transaction) from the external and registers the received transaction into the Tr queue 310, if the transaction can be registered. When a query is registered, the LI pointer is updated.

First, the Tr receive unit initializes the pointers (PI, EI, and LI) (step 601).

Then, the Tr receive unit clears the table 500 and initializes the Tr queue 310. The flags are set at "null" when initialized (step 602).

Next, the Tr receive unit monitors query input from the client (UAP) and detects whether or not a query has been received (step 604).

If a query has been received, the Tr receive unit determines whether the query can be registered (step 606). Specifically, it is judged whether the following conditions are met. If a query column is filled with query data, but both its execution flag and copy flag are "ON," an overwrite to the query column is allowable, because both the copy and execution of the query are complete. If the execution flag and copy flag are both "null" in the column pointed at by "LI+1," an empty column in which no query data has been registered exists in the Tr queue.

If the new query cannot be registered, the Tr receive unit notifies the client (UAP) that it cannot accept the query (step 607) and returns to step 604.

Otherwise, if the new query can be registered, the Tr receive unit sets the transaction ID that includes the query and the query type in the column pointed at by "LI+1" (step 609). Both its copy flag and execution flag are set to OFF. In step 610, then, the Tr receive unit updates the LI pointer (increments the LI pointer by one, LI=LI+1) and returns to step 604.

FIG. 5 is a flowchart of processing that is performed by the Tr duplication and execution unit in Embodiment 1 of the present invention.

The Tr duplication and execution unit 302 in the primary site executes a query that has been copied. Otherwise, the Tr duplication and execution unit executes an uncopied query that is other than a commit. If the uncopied query is a commit, the Tr duplication and execution unit performs a simultaneously sync copy of all the uncopied queries in the queue.

First, the Tr duplication and execution unit determines whether the query pointed at by the execution pointer EI, for which the processing procedure is performed, is not yet executed (step 702). If the query pointed at by the EI is not yet executed, it turns out that there are queries to be executed.

If there is no query to be executed, the Tr duplication and execution unit determines whether the execution pointer EI can be updated (incremented) (that is, whether a new query has been received) (step 704). If the EI can be updated, the Tr duplication and execution unit updates the EI (step 706) and goes to step 709. Otherwise, if the EI cannot be updated, the Tr duplication and execution unit returns to step 704 and waits for a new query to be received and increment of the queue end pointer LI.

When it is determined that the query pointed at by the EI pointer is not yet executed, the Tr duplication and execution unit determines whether the query (to be executed) has been copied (step 709).

If the query pointed at by the EI pointer is not yet copied, the Tr duplication and execution unit determines whether the query is a commit (step 711). If the query is not a commit, the Tr duplication and execution unit executes the query and sets the execution flag of the query to ON (step 712). Then, the Tr duplication and execution unit determines whether EI is still less than LI, that is, whether the EI can be updated (step 713). If the EI can be updated, the Tr duplication and execution unit updates the EI (step 715) and returns to step 711. Otherwise, if the EI cannot be updated, the Tr duplication and execution unit returns to step 702.

When it is determined that the query is a commit in step 711, the value of the LI pointer is saved to a register L0 which is not shown (step 717). Then, the Tr duplication and execution unit performs a simultaneously sync copy of all the uncopied queries (queries from PI+1 to L0) in the queue (step 718). After the completion of the sync copy, the Tr duplication and execution unit sets the copy flags of all copied queries to ON and updates the PI pointer to L0 (step 719). The Tr duplication and execution unit executes the query pointed at by the EI pointer and sets the execution flag of the query to ON (in step 720).

Then, the Tr duplication and execution unit determines whether the EI can be updated (step 721). If the EI can be updated, the Tr duplication and execution unit updates the EI (step 723) and returns to step 709. Otherwise, if the EI cannot be updated, the Tr duplication and execution unit returns to step 702.

When it is determined that the query has been copied in step 709, the Tr duplication and execution unit executes the query and sets the execution flag to ON in step 725. Then, the Tr duplication and execution unit determines whether the EI can be updated (step 726). If the EI can be updated, the Tr duplication and execution unit updates the EI (step 728) and returns to step 708. Otherwise, if the EI cannot be updated, the Tr duplication and execution unit returns to step 701.

FIGS. 6A through 6D exemplify how the Tr queue in the primary site 100 and the Tr queue in the secondary site 110 work when copies are performed in Embodiment 1.

Figure 6A:
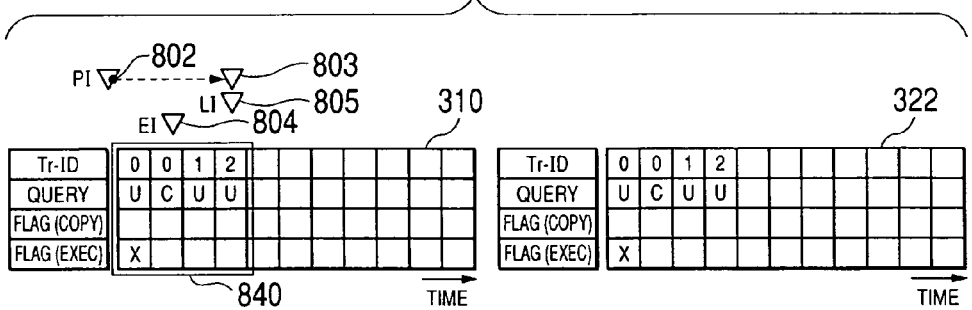
FIGS. 6A, 6B, 6C, and 6D exemplify the contents of the Tr queue in the primary site and the contents of the Tr queue in the secondary site when copies are performed in Embodiment 1 of the present invention.

FIG. 6A shows the state of the Tr queue 310 in the primary site and the state of the Tr queue 322 in the secondary site when the second query (pointed at by the EI pointer 804) is executed.

Because the query pointed at by the EI pointer is neither yet executed nor copied and a commit (C) ("y" in step 711 in FIG. 5), uncopied queries in the queue (falling within a window 805, from the query following the one pointed at the PI pointer 802 to the query pointed at the LI pointer 805) are simultaneously sync copied to the secondary site 110 (step 718 in FIG. 5). At the completion of the simultaneous copy, the contents of the Tr queue 310 in the primary site and the contents of the Tr queue 322 in the secondary site are as shown in FIG. 6A, respectively.

In the Tr queue 310 in the primary site, then, the PI pointer that points at the last copied query is updated; it moves from position 802 to position 803. The copy flags of the queries which have just been copied are set to ON (step 719 in FIG. 5). Finally, the query (commit) pointed at the EI pointer 804 is executed in the primary site 100 and the execution flag of the query is set to ON (step 720 in FIG. 5).

Figure 6B:
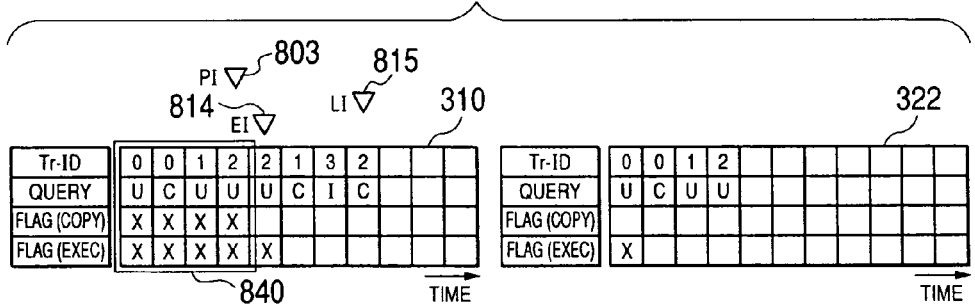

FIG. 6B shows the contents of the Tr queues 310 and 322 grown after the sync copy of the queries falling within the window 840 before the next copy.

In the primary site 100, queries are input at any timing. In the queue state shown in FIG. 6B, four new queries have been input and the LI pointer is updated and moves to position 815.

Here, because the copied queries can be executed independent of the types of the queries, the queries falling within the window 840 (queries in the third and fourth columns of the Tr queue 310) are executed in the primary site 100 without regard to linkage with the secondary site 110. Even for queries falling outside the window 840, the queries other than a commit can be executed without regard to linkage with the secondary site 110. Thus, a query (U: update) in the fifth column of the Tr queue 310 is executed before being copied. However, if the query is a commit, it should be executed after being copied.

Figure 6C:
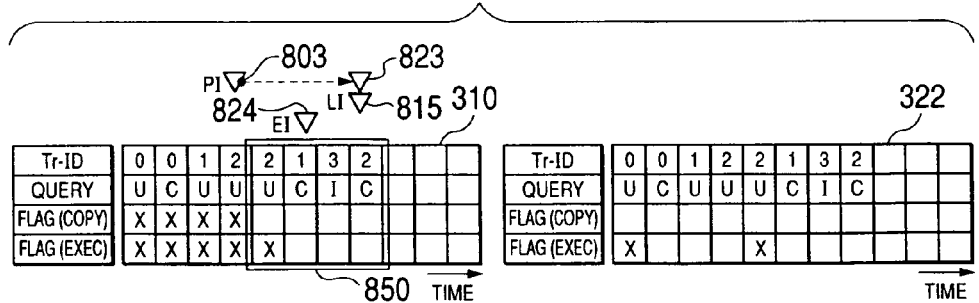

FIG. 6C exemplifies how the contents of the Tr queues 310 and 322 grow when a query in the sixth column of the Tr queue 310 (query pointed at the EI pointer 824) is executed.

Because the query in the sixth column is neither yet executed nor copied and a commit ("y" in step 711 in FIG. 5), uncopied queries in the queue (falling within a window 805, from the query following the one pointed at the PI pointer 803 to the query pointed at the LI pointer 815) are simultaneously sync copied to the secondary site 110 (step 718 in FIG. 5). At the completion of the simultaneous copy, the contents of the Tr queue 310 in the primary site and the contents of the Tr queue 322 in the secondary site are as shown in FIG. 6C, respectively.

In the Tr queue 310 in the primary site, then, the PI pointer is updated; it moves from position 803 to position 823. The copy flags of the queries which have just been copied are set to ON (step 719 in FIG. 5). Finally, the query pointed at the EI pointer 824 is executed in the primary site 100 and the execution flag of the query is set to ON (step 720 in FIG. 5).

Figure 6D:
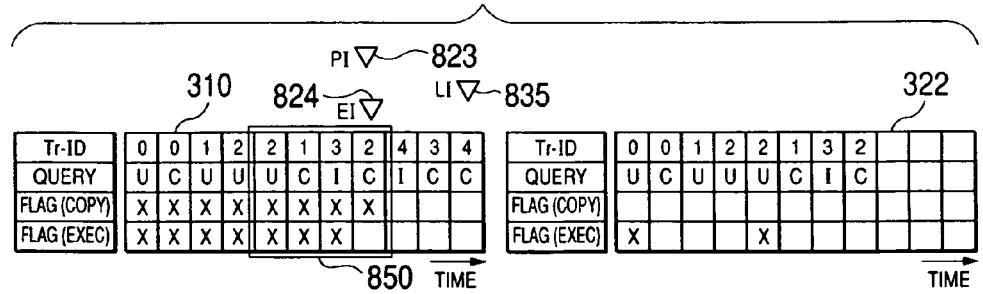

FIG. 6D shows the contents of the Tr queues 310 and 322 grown after the second-time copy before a third-time copy.

In the Tr queue 310 in the primary site, because the queries that fall within the window 850 have been copied yet and can be executed independent of the types of the queries and without regard to linkage with the secondary site 110, a query in the seventh column is executed.

In the following, processing in the secondary site 110 will be described.

Figure 7:
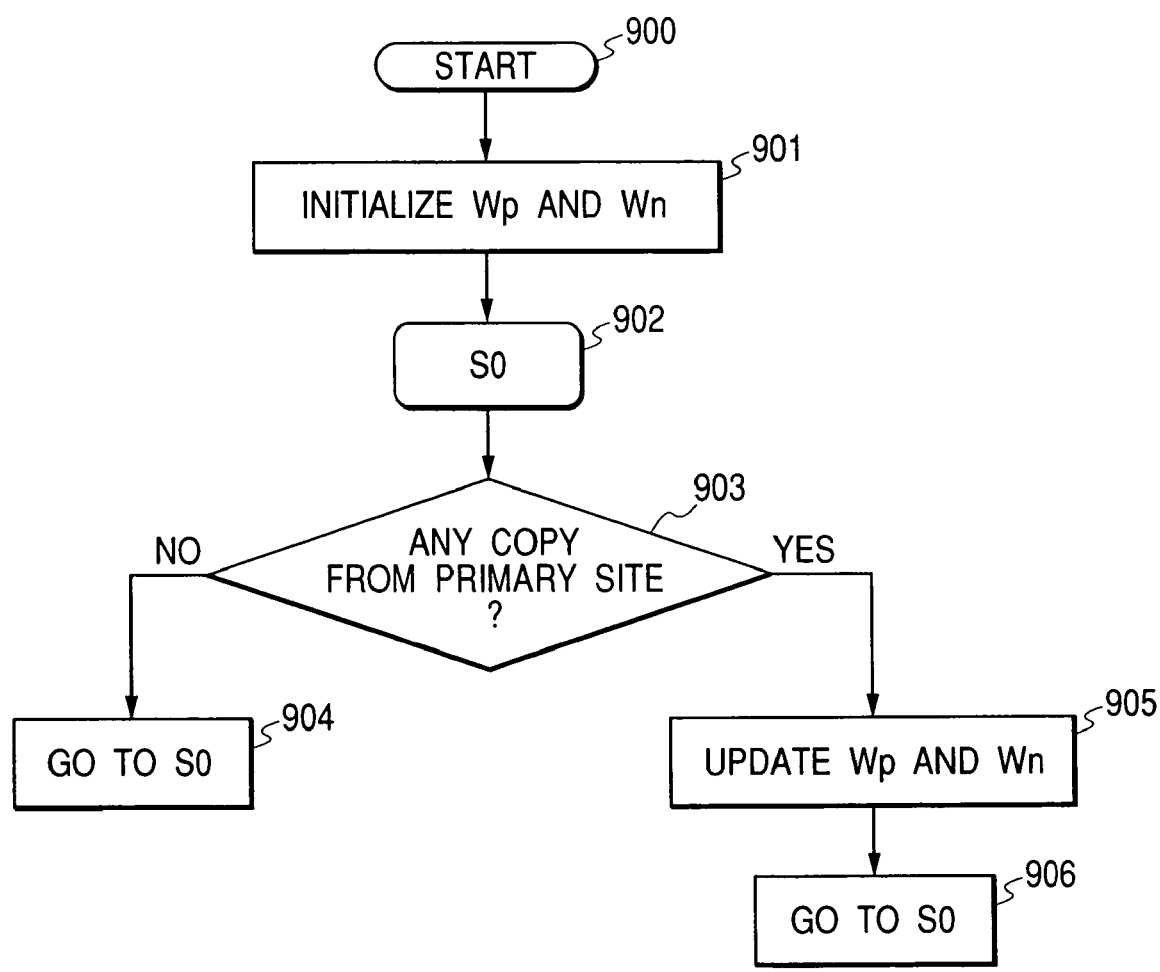
FIG. 7 is a flowchart of processing that is performed by a transaction (Tr) receive unit in the secondary site in Embodiment 1 of the present invention.

FIG. 7 is a flowchart of processing that is performed by the Tr receive unit 330 in Embodiment 1 of the present invention.

The Tr receive unit 330 in the secondary site receives transactions and queries data transmitted by the Tr duplication and execution unit 302 in the primary site and manages the copy states of the transactions and queries. Concretely, the Tr receive unit manages a copy window (Wn) which is a range of a latest copy and a copy window (Wp) which is a range of the preceding copy.

First, the Tr receive unit 330 initializes the Wn and Wp (step 901). Then, the Tr receive unit waits for queries to be copied from the primary site 100 (step 903). When having received a copy of queries, the Tr receive unit accepts the copied queries and updates the Wn and Wp (step 905).

Figure 8:
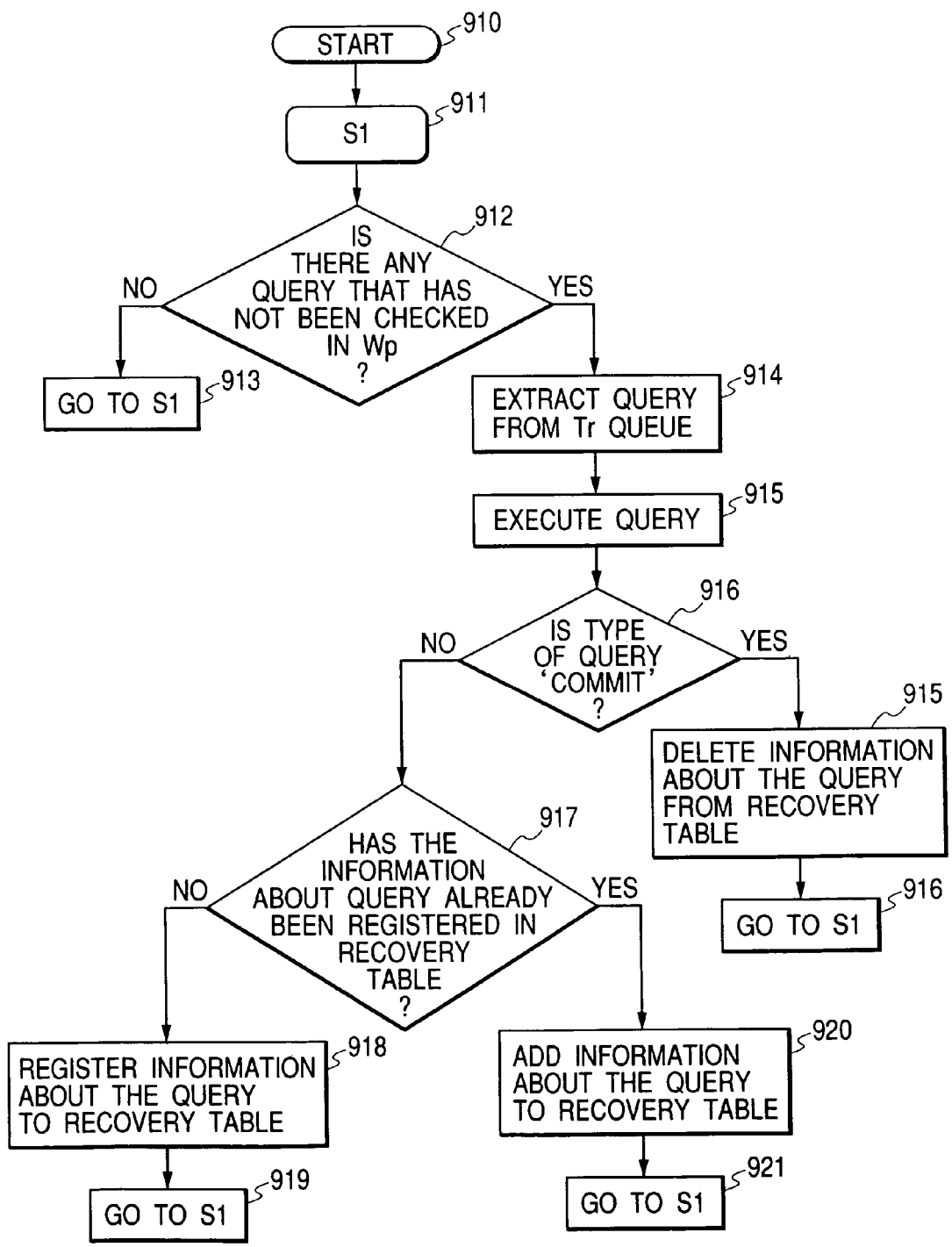
FIG. 8 is a flowchart of processing that is performed by a transaction (Tr) execution unit in the secondary site in Embodiment 1 of the present invention.

FIG. 8 is a flowchart of processing that is performed by the Tr execution unit 331 in Embodiment 1 of the present invention.

Each time a copy is performed, the Tr execution unit 331 executes the queries falling within the Wp. At this time, the Tr execution unit determines whether the commit has been executed in the primary site 100 and, if it cannot determine that, registers the queries data into the recovery table.

First, the Tr execution unit determines whether an unchecked query exists in the preceding copy window WP (step 911). If an unchecked query exists, the Tr execution unit extracts the query (step 914) and executes the query (step 915). The Tr execution unit determines whether the query is a commit (step 916) and, if the query is not a commit, determines whether data for the transaction that includes the query has been registered in the recovery table (step 917). If the data for the transaction that includes the query is not registered in the recovery table, the Tr execution unit registers the data for the transaction that includes the query (step 918). Here, at least the ID of the transaction is registered in the recovery table.

Otherwise, if it is determined that the data for the transaction that includes the query is registered in the recovery table in step 917, the Tr execution unit adds the transaction data (e.g., the query type and the time when the query was copied) to the recovery table (step 920). If only the transaction ID is registered, it is not necessary to execute the step 920.

If it is determined that the query is a commit in step 916, it turns out that the commit has been executed in the primary site 100. The reason hereof is that the queries falling within the Wp are not those copied by the latest copy and all the queries copied by the preceding copy are executed in the primary site 100 before the next copy of queries is performed. Thus, the Tr execution unit deletes the data for the transaction that includes the commit query from the recovery table 341 (step 915).

All the queries falling within the Wp are subjected to the above-described processing performed by the Tr execution unit 331. Data for a transaction for which it cannot be determined whether the commit has been executed in the primary site 100 is registered in the recovery table 341.

Figure 9A:
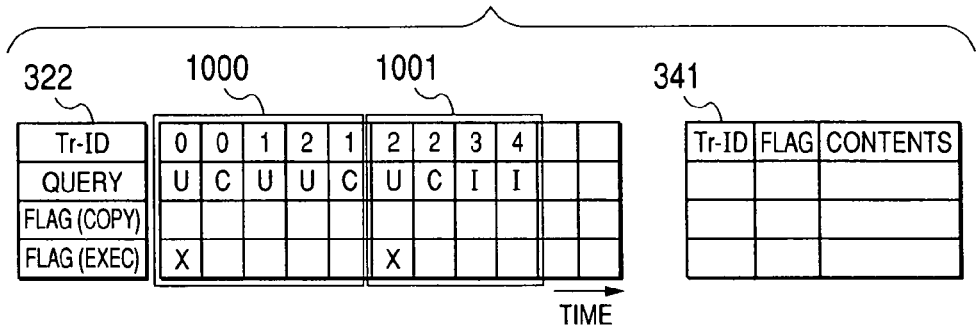
FIGS. 9A, 9B, and 9C exemplify how the contents of the Tr queue in the secondary site are when copies are performed in Embodiment 1 of the present invention.
Figure 9B:
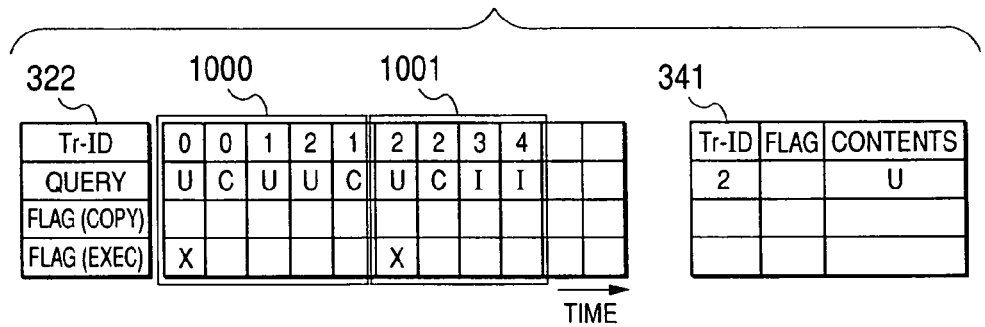
Figure 9C:
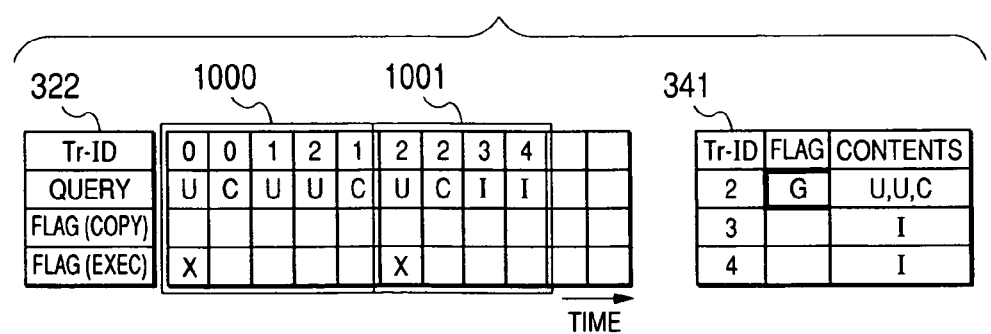

FIGS. 9A through 9C exemplify how the contents of the Tr queue in the secondary site are when copies are performed in Embodiment 1 of the present invention. FIGS. 9A and 9B show the states of the Tr queue 322 and the recovery table 341 when in normal operation and FIG. 9C shows the states of the Tr queue 322 and the recovery table 341 when failure occurs.

In the recovery table 341, transaction ID, flag, and contents (queries) per transaction are registered. Especially important are transaction ID and flag. The recovery table includes data for transactions for which the commit has not been executed. As for such transactions, there are two cases: one case where the commit itself has not been input and the other case where the commit has been input, but it cannot be determined whether the commit has been executed (gray). The flag is used for management to discriminate between these two cases and, for the latter case, the flag value is set to "G."

For the transaction contents, the types of the queries constituting the transaction are registered. Because the types of the queries are recorded in transaction logs also, it is omissible to register them in the recovery table 341.

FIG. 9A shows the states of the Tr queue 322 and the recovery table 341 in the secondary site immediately after queries in a window 1001 have been copied. In the Tr queue 322 in the secondary site, a window 1000 represents the Wp (the range of the preceding copy) and the window 1001 represents the Wn (the range of the latest copy). Because it is immediately after the copy, no data is registered in the recovery table 341.

FIG. 9B shows the states of the Tr queue 322 and the recovery table 341 immediately after the Tr execution unit 331 has checked the Tr queue 322 and updated the recovery table 341. The Tr execution unit 331 checks the queries falling within the window 1000 and registers data for transactions with ID 0, ID 1, and ID 2 in the recovery table. However, as for the transactions with ID 0 and ID 1, their commit queries exist within the window 1000 which is the window Wp of the queries received by the preceding copy and, therefore, it can be determined that the commits have been executed in the primary site 100. Thus, the data for the transactions with ID 0 and ID 1 is deleted from the recovery table 341. As a result, only the data for the transaction with ID 2 is registered in the recovery table 341.

Each time a copy is performed, the Tr execution unit 331 updates the data for transactions for which it cannot be determined whether the commit has been executed. Because it is finally determined whether a transaction is gray after failure occurs, the flag value is not set before the failure occurrence.

In the following, a failure recovery process and a process of taking over the operation in the secondary site 100 in case failure should occur in the primary site 100 will be described.

Figure 10:
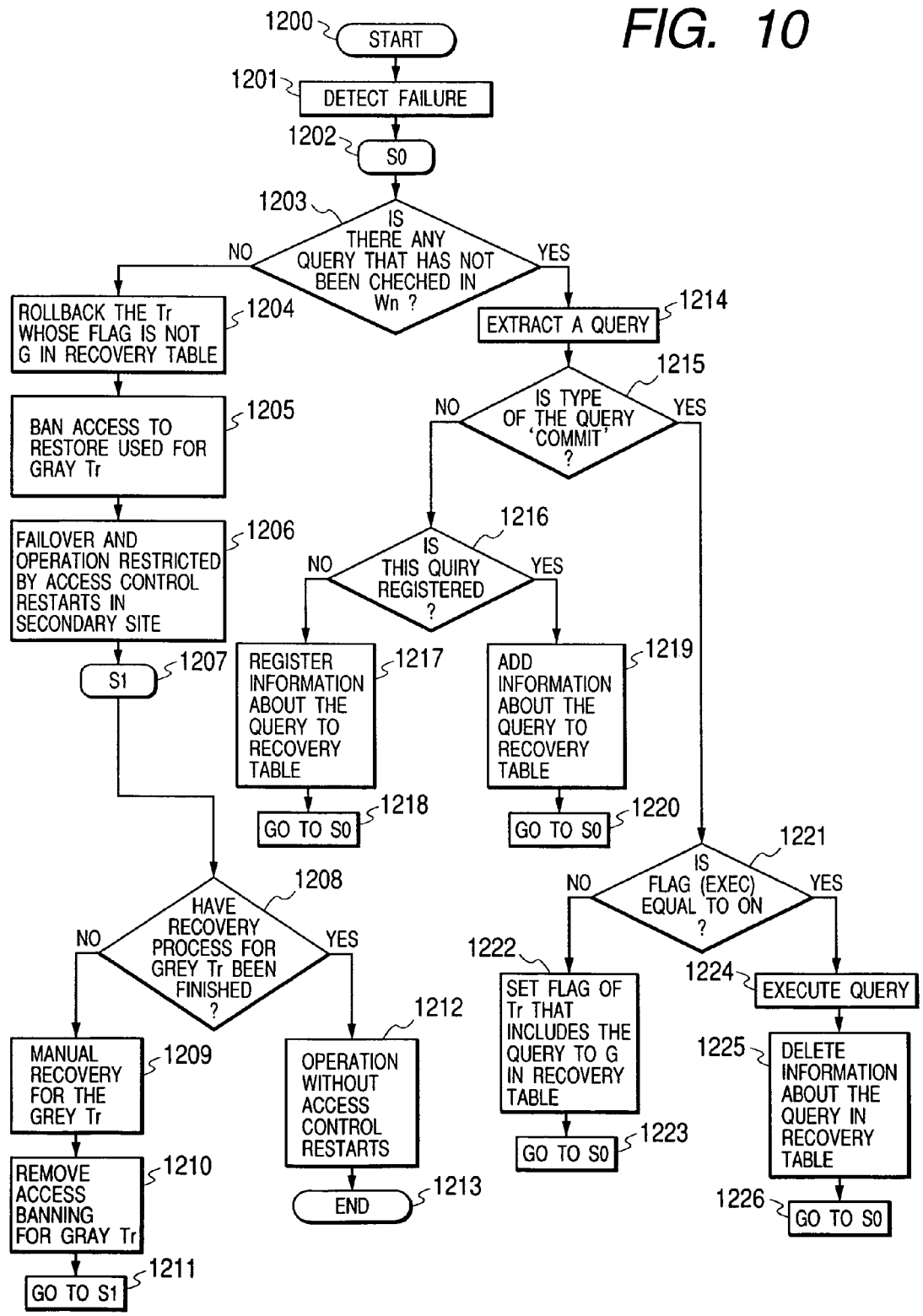
FIG. 10 is a flowchart of failure recovery processing in the secondary site in Embodiment 1 of the present invention.

FIG. 10 is a flowchart of failure recovery processing in the secondary site 110 in Embodiment 1 of the present invention.

In case of failure occurring, first, checking for gray queries is first performed until all the queries falling within the Wn have been checked (steps 1214 to 1225).

First, the secondary site detects failure of the primary site (step 1201). For example, alive check signals are periodically communicated between the primary site and the secondary site and failure can be detected by unsuccessful alive checks that occur repeatedly in a predetermined period.

Next, the queries falling within the Wn, received by the latest copy, are checked and it is determined whether an unchecked query exists (step 1203). If an unchecked exists, the query is extracted (step 1214) and it is checked whether the query is a commit (step 1215).

If the query is not a commit, it is determined whether data for the transaction that includes the query has been registered in the recovery table 341 (step 1216). If it is determined that the data for the transaction is not yet registered, the data for the transaction is newly registered into the recovery table 341 (step 1217). Otherwise, if the data for the transaction has been registered, the query-specific data is added to the contents of the recovery table (step 1219).

If it is determined that the query is a commit in step 1215, it is determined whether the execution flag of the query is ON (step 1221). If the execution flag of the query is not ON, the transaction that includes the query is judged gray. The reason hereof is that the commit has been received by the latest copy and it cannot be determined whether the commit included in the last copy range has been executed in the primary site 100. Thus, the flag of the transaction that includes the query (commit) is set to "G" in the recover table (step 1222). Otherwise, if the execution flag is ON, it is verified that the commit has been executed and, therefore, the query (commit and unexecuted queries of the transaction) is executed (step 1224), and the data for the transaction that includes the query is deleted from the recovery table (step 1225).

An example of the contents of the recovery table when failure is detected is shown in FIG. 9C. Here, the window 1000 represents Wp, the range of the preceding copy and the window 1001 represents Wn, the range of the latest copy. By checking the Wn 1001, it is found that two queries of different types (U and C) as parts of a transaction with ID 2 are added. Also, a commit (C) exists within the Wn 1001 and its execution flag is not ON, that is, it is unknown whether the commit (C) of the transaction with ID 2 has been executed in the primary site 100. Thus, the transaction with ID 2 is judged gray and its flag is set to "G."Moreover, two new transactions with ID 3 and ID 4 are registered. However, because their commits do not exist within the Wn 1001, their flag values are not set.

Returning to FIG. 10, a recovery process for operation restart in the secondary site (steps 1204 to 1213) will be described below.

When it is ascertained that the queries falling within the Wn have been checked, first, the transactions without a "G" flag (indicating that no commit has been input for these transactions) in the recovery table are rolled back to the state before the start of the transaction (step 1204).

Then, the transactions with the "G" flag, that is, gray transactions for which it cannot be determined whether the commit has been executed are identified in the recovery table 341. Resources used for the gray transactions are identified and access control is set to ban access to the resources (step 1205). The access control is exerted, for example, by placing exclusive locks on particular rows and cells in a table in the DMBS.

Next, failover from the primary site 100 to the secondary site 110 is performed automatically and operation restricted by access control restarts in the secondary site 110 (step 1206).

Next, recovery processing for the gray transactions is performed in step 1208 and subsequent. First, it is determined whether recovery has been finished for all gray transactions (step 1208). If gray transaction recovery is not finished and any gray transaction remains, a gray transaction is manually recovered (step 1209). Manual recovery of a gray transaction is performed, for example, by contacting a corporate or general user that issued the transaction. Upon the completion of the manual recovery, access banning on the resources used for the gray transaction is removed (step 1210). If the recovery for all gray transactions has been finished, operation without access control restarts (step 1212).

In the above-described processing in the secondary site (FIGS. 7 to 10), the secondary site 110 which is a second information processing equipment receives queries copied from the primary site 100 which is a first information processing equipment and creates a data table for failure recovery (steps 918 and 920 in FIG. 8). When the secondary site detects failure of the primary site 100 (step 1201 in FIG. 10), the queries falling within the preceding copy range Wp, copied from the primary site 100, are referred to and data for transactions which are not yet permanently saved to the storage 311 is deleted from the above data table for failure recovery (step 1224 in FIG. 10) and these transactions are rolled back to the state before the start of the transaction. Among the queries falling within the preceding copy range Wp, copied from the primary site 100, data for transactions which have been saved permanently to the storage 311 is added to the above data table for failure recovery (steps 1217 and 1219 in FIG. 10). Thus, manual recovery can be performed for the transactions which have been committed and saved permanently to the storage 311 by referring to the data for these transactions derived from the queries falling within the preceding copy range Wp, copied from the primary site 100, and added to the above data table for failure recovery (step 1222 in FIG. 10).

In Embodiment 1 described hereinbefore, the Tr queues 300 and 320 are provided respectively in each DBMS in the primary and secondary sites and transactions and queries data entered from the client 130 are once stored into the Tr queue 300. When a transaction is committed in the primary site 100, uncopied queries remaining in the Tr queue are simultaneously sync copied to the secondary site 100 and it is ensured that the queries constituting the transaction have bee copied before the transaction commit is executed. Thus, such a D/R system can be realized that, even for remotely locates sites, copying transactions from one site another site involves no missing transactions.

Specifically, the primary site 100, when executing a query that is not yet copied, copies the queries that remain uncopied among the accepted queries, and the secondary site 110 receives these queries from the primary site 100. Thus, the secondary site 110 equipment can determine that the queries received before the queries that have just been copied from the primary site 100 have been executed in the primary site 100 and executes the queries thus determined executed in the primary site, thereby duplicating transactions between the primary site 100 and the secondary site 100.

Because uncopied queries of transactions in the Tr queue 310 are copied simultaneously when a copy is performed, the frequency of copies can be reduced and throughput performance of transaction processing can keep at a desired level even for transactions between remotely located sites.

The secondary site 110 equipment determines whether a transaction has been committed in the primary site from the sequence of copied queries of transactions it received and sequentially executes transactions and queries that can be judged committed prior to failure occurrence. Consequently, when failure occurs, only transactions for which it cannot be determined whether the transactions have been committed are subjected to manual recovery. Access to the resources that are used for the commit-undeterminable transactions is banned and operation restricted by access control restarts in the secondary site. Although the secondary site 110 equipment cannot completely know that the commit of every transaction has been executed in the primary site 100, the secondary site equipment can discriminate between committed transactions and transactions that may have been committed. Therefore, recovery processing from failure can be aimed exclusively at the transactions that may have been committed.

In the secondary site 110, committed transactions and queries are sequentially executed and, thus, change made in the primary site 100 can be permanently saved to the storage in the secondary site in quasi-real time. Consequently, when failure occurs in the primary site and failover occurs to the secondary site 110, data to be permanently saved has been done mostly and quick restart of operation is possible.

Immediately after failure occurring, operation can restart, restricted by access control that is exerted on gray transactions only.

Next, a preferred Embodiment 2 of the present invention will be described.

Figure 11:
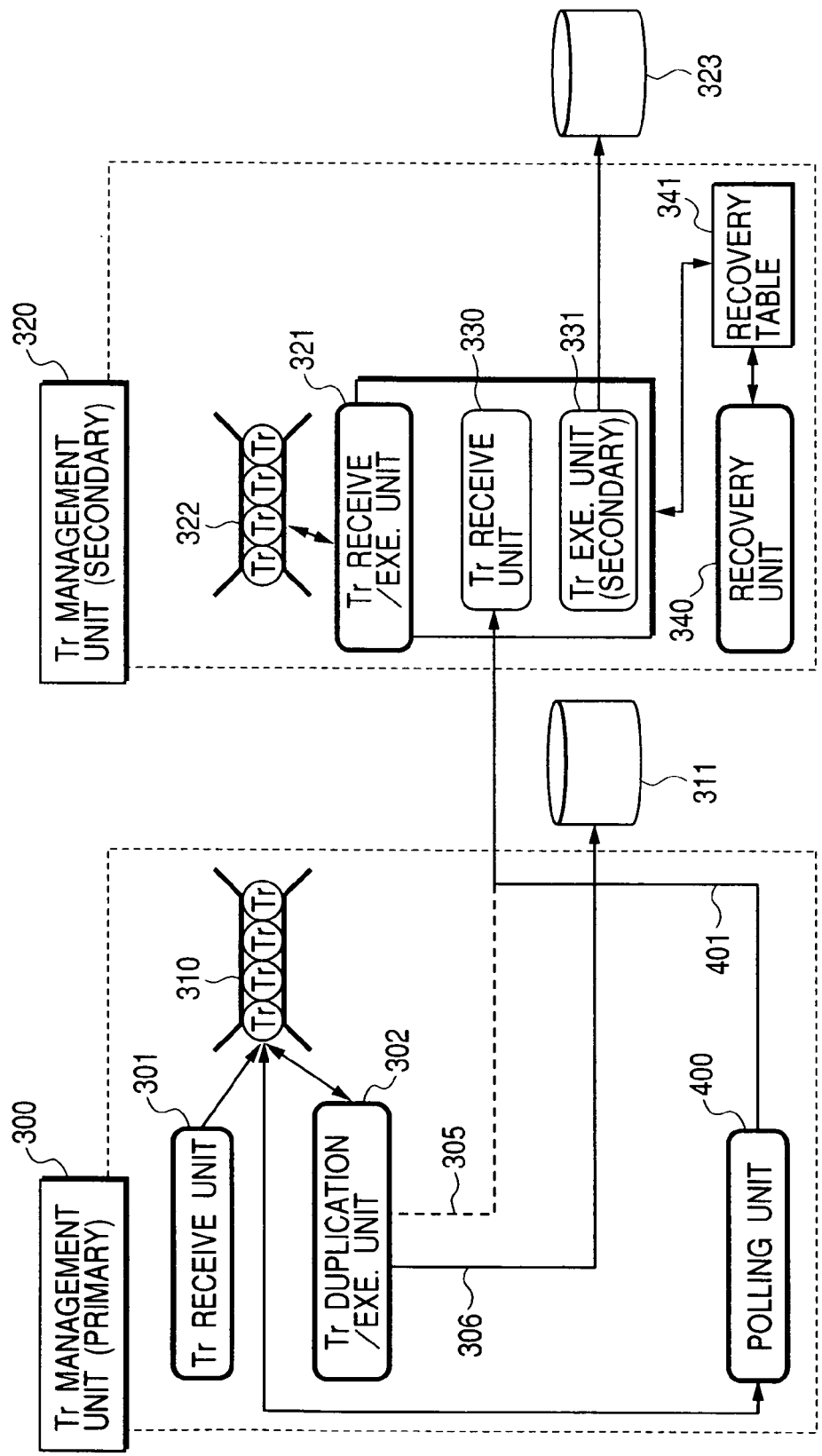
FIG. 11 is a diagram showing another example of the configurations of the Tr management units according to a preferred Embodiment 2 of the present invention.

FIG. 11 is a diagram showing another example of the configurations of the Tr management units according to a preferred Embodiment 2 of the present invention. In Embodiment 2 shown in FIG. 11, the Tr management unit 300 in the primary site includes a polling unit 400.

The polling unit 400 monitors the Tr queue (for example, periodically) and simultaneously copies uncopied queries in the queue.

When the Tr duplication and execution unit 302 retrieves a query from the Tr queue 310, the likelihood that the query has been copied increases because of the use of the polling unit 400 and, consequently, the influence of copying transactions and queries to the secondary site on the transaction processing performance can be reduced. If the query retrieved from the Tr queue 310 is not yet copied, the Tr duplication and execution unit 302 performs the same processing for the query as described in the foregoing Embodiment 1 (FIG. 2).

Figure 12:
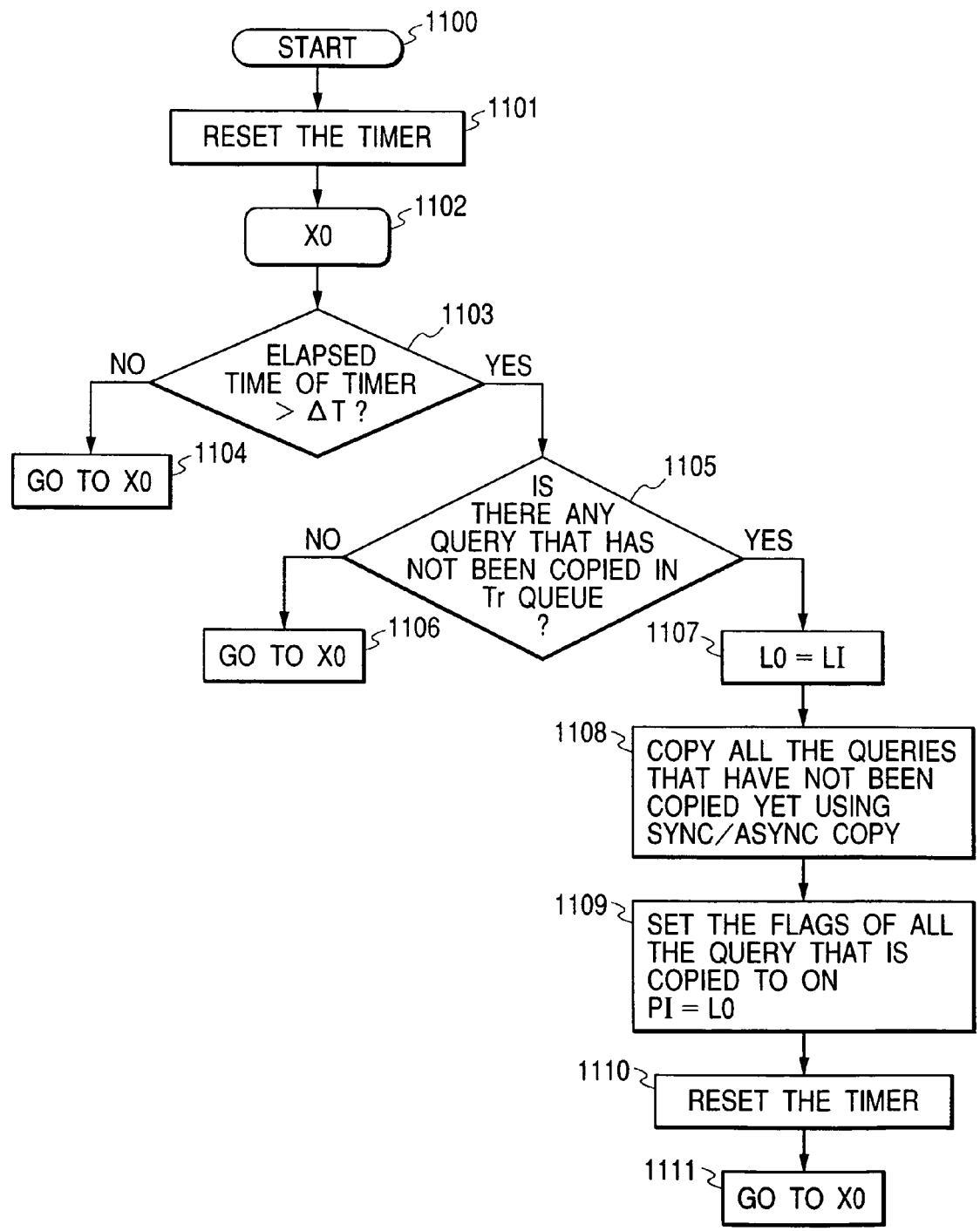
FIG. 12 is a flowchart of processing that is performed by a polling unit in Embodiment 2 of the present invention.

FIG. 12 is a flowchart of processing that is performed by the polling unit in Embodiment 2 of the present invention.

Because the polling unit 400 in the primary site performs copies of transactions and queries periodically, when executing a query in the processing that is performed by the Tr duplication and execution unit 302, the likelihood that the query has been copied increases and, consequently, the influence of copy operation on the transaction processing performance of the primary site can be reduced.

First, the polling unit initializes (resets) a timer (step 1101).

Then, the polling unit determines whether predetermined time ΔT has elapsed (step 1103)

If time ΔT has elapsed, the polling unit determines whether uncopied queries exist in the Tr queue 310 (step 1105).

If uncopied queries exist, the polling unit simultaneously copies the uncopied queries in the queue (steps 1107 to 1110). This simultaneous copy is performed as follows. First, the polling unit saves the value of the LI pointer that represents the last query in the queue to the L0 (step 1107) and simultaneously copies the uncopied queries PI+1 to L0 (step 1108). After the completion of the copy, the polling unit sets the copy flags of the queries to ON and updates the PI pointer that points at the last copied query to L0 (step 1109). Finally, the polling unit resets the timer (step 1110) and returns to step 1103.

This simultaneous copy (steps 1107 to 1110) may be either a sync copy or async copy. In the case of an async copy, in step 1109, the copy flags of the queries can be set to ON and the PI pointer that points at the last copied query can be updated prior to the completion of the copy.

Figure 13:
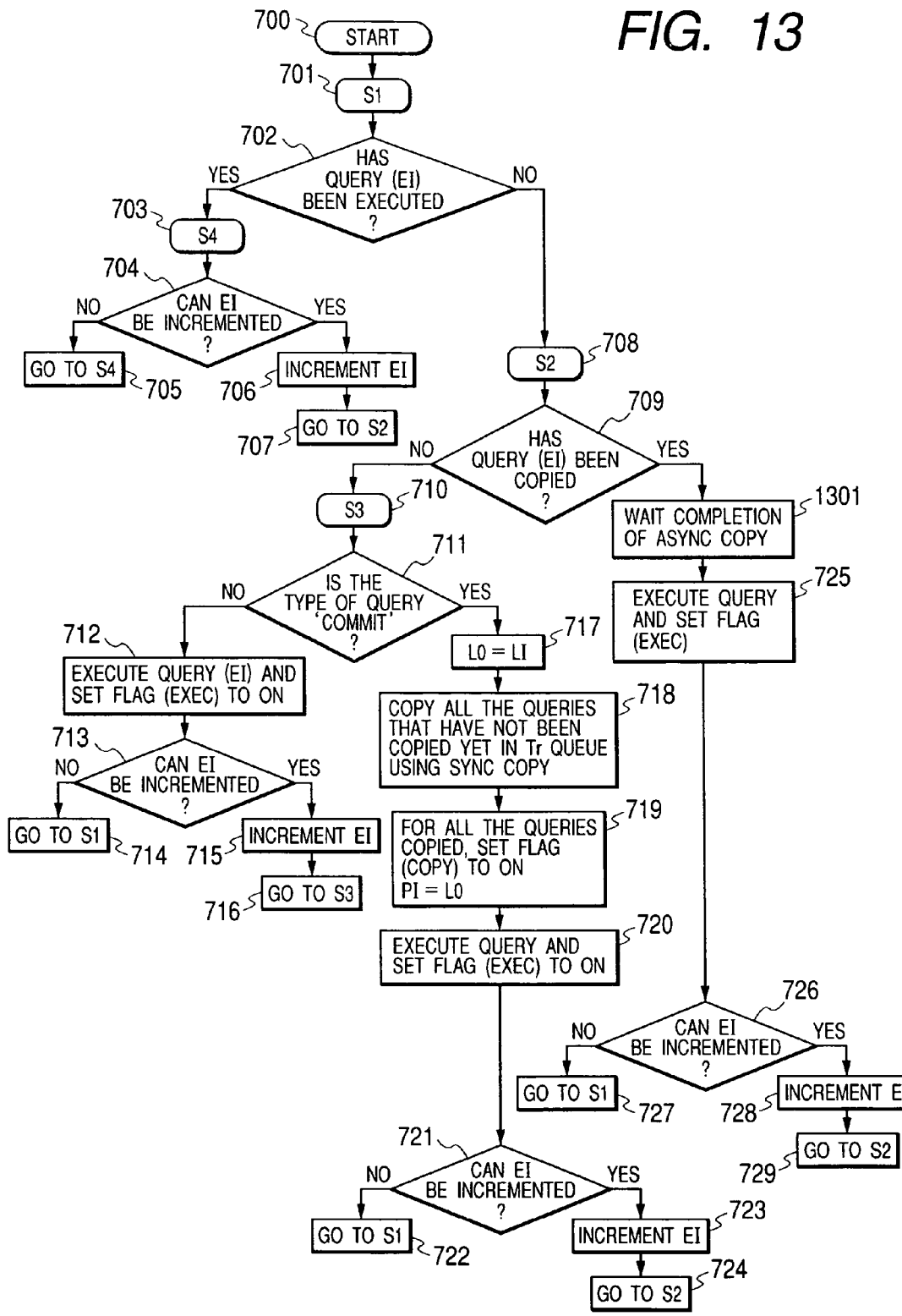
FIG. 13 is a flowchart of processing that is performed by the Tr duplication and execution unit in Embodiment 2 of the present invention.

FIG. 13 is a flowchart of processing that is performed by the Tr duplication and execution unit in Embodiment 2 of the present invention.

This processing flow includes step 1301 which differs from the processing (FIG. 5) performed by the Tr duplication and execution unit where an async copy is not performed by the polling unit 400. Specifically, the completion of an async copy is ascertained (step 1301) before executing the copied query in step 725. After the completion of an async copy is made certain, the copied query is executed (step 725). Even when the polling unit 400 applies an async copy mode, it can thus be ensured that a copy to the secondary site 110 is complete before executing a commit in the primary site 100.

When the polling unit 400 in the primary site applies a sync copy mode, not the async copy mode, each time a sync copy is performed, the completion of the copy is ascertained and, therefore, it is not necessary to make certain of the completion of an async copy before executing the query as in step 1301.

Next, a preferred Embodiment 3 of the present invention will be described.

Because a sync copy of queries from the primary site 100 to the secondary site is performed before the queries are executed in the present invention, the executed status of the queries is not conveyed to the secondary site 110. However, when the queries have been executed, by copying their executed status also to the secondary site, the query executed status data can be referred to in the secondary site 110.

Figure 14:
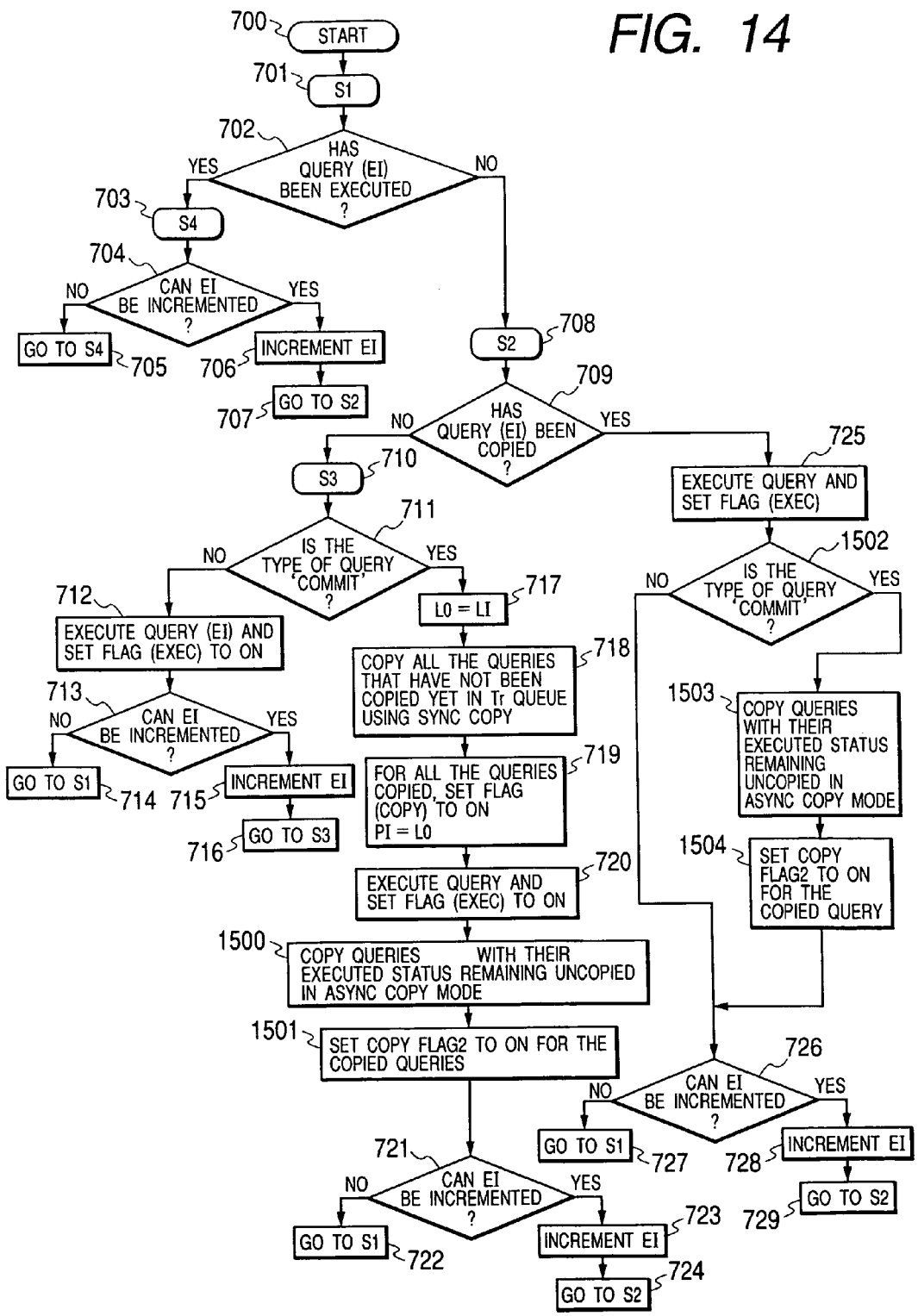
FIG. 14 is a flowchart of processing that is performed by the Tr duplication and execution unit in a preferred Embodiment 3 of the present invention.

FIG. 14 is a flowchart of processing that is performed by the Tr duplication and execution unit in Embodiment 3 of the present invention.

This processing flow includes steps 1500, 1501, 1502, 1503, and 1504 which differ from the processing (FIG. 5) performed by the Tr duplication and execution unit in the foregoing Embodiment 1. Specifically, immediately after the query execution (step 720), the executed status is conveyed to the secondary site (step 1500). For this purpose, the async copy mode is applied to minimize the influence of copy operation on the transaction processing performance. The reason hereof is that conveying the executed status to the secondary site for reducing transactions judged gray may be less reliable, whereas a sync copy of queries before a commit must be well reliable to ensure no loss of transactions.

Figure 15:
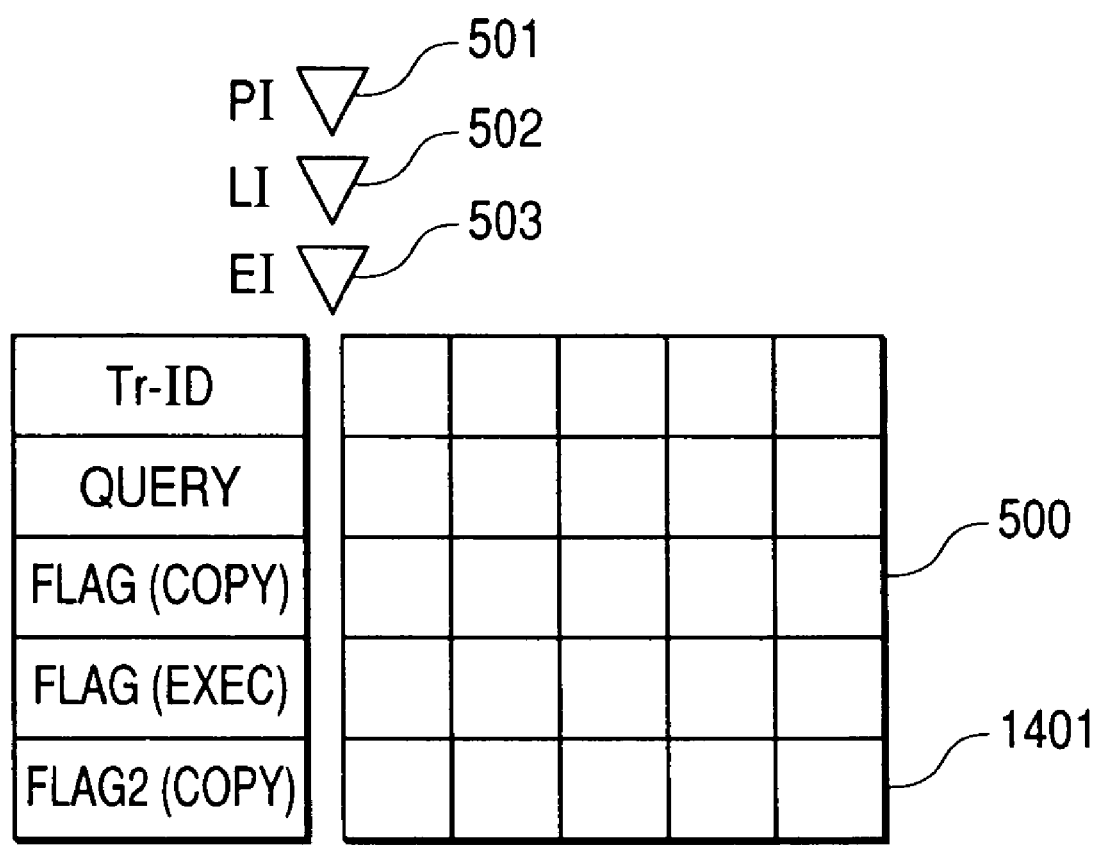
FIG. 15 illustrates the Tr queue in the primary site in Embodiment 3 of the present invention.
Figure 16:
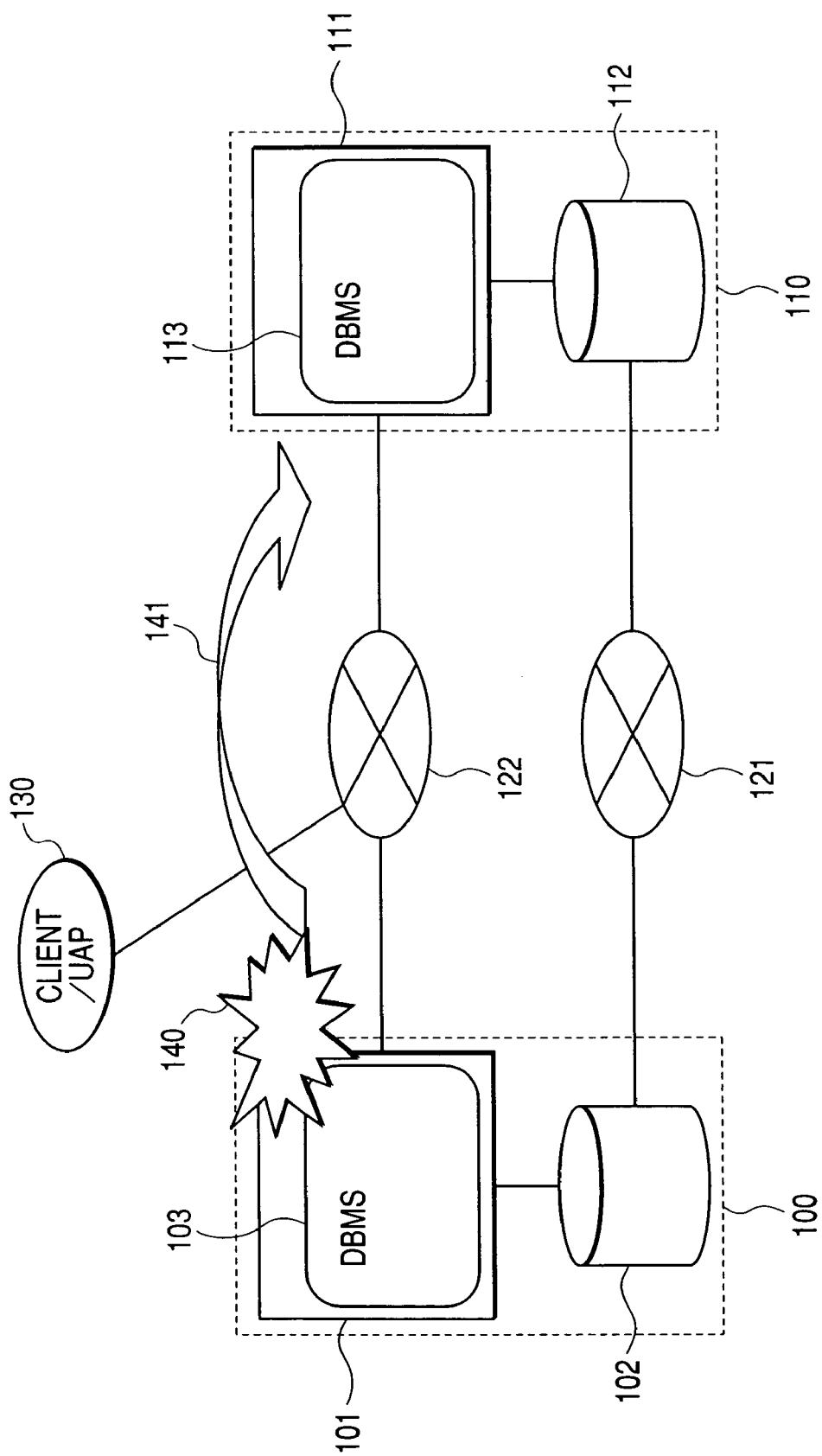
FIG. 16 is a conventional D/R system configuration diagram.

In Embodiment 3, to the above-mentioned structure of the Tr queues 310 and 322, a copy flag2 (1401) to indicate whether the executed status has been copied is added, as is shown in FIG. 15, in order to convey the query executed status to the secondary site. When query executed status has been conveyed to the secondary site by an async copy, this copy flag2 (1401) is set to ON.

Concretely, if the query is a commit (step 711), after executing the query (step 720), the Tr duplication and execution unit simultaneously copies queries with the copy flag2 being not ON (their executed status remaining uncopied) in the async copy mode (step 1500). Then, the Tr duplication and execution unit sets the copy flag2 to ON for the thus copied queries (step 1501).

If the query has been copied (step 709), after executing the copied query (step 725), the Tr duplication and execution unit determines whether the query is a commit (step 1502). If the query is a commit, the Tr duplication and execution unit simultaneously copies queries with their executed status remaining yet unconveyed to the secondary site in the async copy mode (step 1503) and sets the copy flag2 to ON for the thus copied queries (step 1504).

In Embodiment 3, by conveying the query executed status from the primary site 100 to the secondary site 110 in the manner described above, in case of failure occurring, transactions judged gray in the secondary site can be reduced. That is, even for a commit within the latest copy range (Wn), it can be made certain whether its transaction has been executed and the number of transactions judged gray and to be subjected to manual recovery can be reduced.

What is claimed is:

1. A data management system for managing a database system including a first information processing system that includes a computing device and a storage, a second information processing system that includes a computing device and a storage, and a communication network connecting the first information processing system with the second information processing system, said data management system being installed in the first information processing system or the second information processing system, and said data management system comprising:

means for determining, when executing a query, whether the query has been copied to said second information processing system;

means for executing the query if the query has been copied; and means for simultaneously copying queries remaining uncopied among accepted queries to said second information processing system if the query has not been copied and if the query is a commit to permanently save results of the executed transaction including the commit query to said storage.

2. The data management system according to claim 1, further comprising means for transferring the query through the network that connects said computing devices.

3. The data management system according to claim 1, further comprising means for transferring the query through the network that connects said storages.

4. The data management system according to claim 1, further comprising means for monitoring the accepted queries at predetermined timing, and means for simultaneously copying queries remaining uncopied, if exist, to said second information processing system.

5. The data management system according to claim 4, further comprising means for performing asynchronous copy of the of the uncopied queries from said first information processing system to said second information processing system, wherein said first information processing system, after confirming the completion of said asynchronous copy, executes said commit.

6. The data management system according to claim 4, further comprising:

means for managing whether said commit executed status has been copied to said second information processing system;

means for copying queries, after the execution of said commit; and means for simultaneously copying the executed statuses of queries with their executed status remaining uncopied among the accepted queries to said second information processing system, if the commit executed status has not been copied to said second information processing system.

7. A data management system for managing a database system including a first information processing system that includes a computing device and a storage, a second information processing system that includes a computing device and a storage, and a communication network connecting the first information processing system and the second information processing system, said data management system being installed in the first information processing system or the second information processing system, and said data management system comprising: means for executing queries accepted by said first information processing system unilaterally and sequentially, wherein said first processing system unilaterally and sequentially executes queries accepted by said first information processing system, before executing a query, determines whether the query has been copied to said second information processing system and whether the query to be executed is a commit query, before executing a query, if determined that the query to be executed has been copied or if determined that the query to be executed is other than a commit query, immediately executes the query, and every time when it is determined that the query to be executed is a commit query which has not been copied to said second information processing system, copies all queries remaining uncopied among accepted queries to said second information processing system and then executing the commit query, and wherein said second information processing system records therein a range of copy on the queries copied from said first information processing, and executes and checks queries falling within a range of preceding copy, when having received queries newly copied from said first information processing system, and records data for transactions for which a commit has not been executed among the queries within the range of the preceding copy as data for failure recovery.

8. The data management system according to claim 7, wherein, upon detecting failure of said first information processing system, said second information processing system stores data for transactions for which a commit to permanently save execution results of a relevant transaction to the storage has not been executed among the queries within a range of a latest copy from said first information processing system from said data for failure recovery to roll back the transactions to the state before the start of the transaction, and stores data for transactions for which execution results of a relevant transaction have been permanently saved to the storage among the queries within the range of the latest copy from said first information processing system as data for manual recovery.

9. The data management system according to claim 8, wherein said second information processing system, upon the completion of checking transactions data for the queries within the latest copy and among the queries within the range of said preceding copy, rolls back the transactions that should be rolled back, bans access to a part of the data contained in the storage which is used for the transactions stored as said data for recovery, and starts processing newly input transactions.

* * * * *